United States Patent
Arviv et al.

(10) Patent No.: US 6,549,759 B2
(45) Date of Patent: Apr. 15, 2003

(54) ASYMMETRIC ADAPTIVE MODULATION IN A WIRELESS COMMUNICATION SYSTEM

(75) Inventors: Eli Arviv, Modiein (IL); Brian Spinar, San Diego, CA (US); Kenneth L. Stanwood, Cardiff by the Sea, CA (US); David Gazelle, San Diego, CA (US); Ofer Zimmerman, Modiin Israel (IL); Penny Efraim, Moshav Nevatim (IL)

(73) Assignee: Ensemble Communications, Inc., San Diego, CA (US)

( * ) Notice: Subject to any disclaimer, the term of this patent is extended or adjusted under 35 U.S.C. 154(b) by 0 days.

(21) Appl. No.: 09/938,216

(22) Filed: Aug. 24, 2001

(65) Prior Publication Data

US 2003/0045307 A1 Mar. 6, 2003

(Under 37 CFR 1.47)

(51) Int. Cl.[7] .............. H04B 1/00; H04B 7/00; H04L 1/38
(52) U.S. Cl. .......... 455/69; 455/552; 455/553; 375/222; 370/347
(58) Field of Search .......... 455/69, 552, 553, 455/102; 375/222, 334, 224, 285, 227, 302; 370/347, 349

(56) References Cited

U.S. PATENT DOCUMENTS

| | | |
|---|---|---|
| 3,949,404 A | 4/1976 | Fletcher et al. |
| 4,495,619 A | 1/1985 | Acampora |
| 5,130,983 A | 7/1992 | Heffner, III |
| 5,297,144 A | 3/1994 | Gilbert et al. |
| 5,420,851 A | 5/1995 | Seshadri et al. |
| 5,444,698 A | 8/1995 | Kito |
| 5,511,082 A | 4/1996 | How et al. |

(List continued on next page.)

FOREIGN PATENT DOCUMENTS

| | | |
|---|---|---|
| EP | 0 507 384 A2 | 10/1992 |
| EP | 0 720 405 A2 | 7/1996 |
| EP | 0 891 060 A2 | 1/1998 |
| EP | 0 845 916 A2 | 6/1998 |
| WO | WO 92/22162 | 12/1992 |
| WO | WO 99/38343 | 7/1999 |
| WO | WO 99/39532 | 8/1999 |
| WO | WO 00/01188 | 1/2000 |

OTHER PUBLICATIONS

Lin., et al., "Error Control Coding, Fundamentals and Applications", Prentice–Hall Computer Applications in Electrical Engineering Series, 1993, pp. 315–349.
L.H. Charles Lee, "Convolutional Coding, Fundamentals and Applications", Artech House, Inc., 1997, pp. 11–51.
Redl, et al., "An Introduction to GSM", Artech House, Inc., 1995, pp. 84, 85, and 95.
C.E. Shannon, "A Mathematical Theory of Communication", Bell System Technical Journal, pp. 379–423 (Part 1), 623–656 (Part II), Jul. 1948.

(List continued on next page.)

Primary Examiner—Vivian Chin
Assistant Examiner—Kamran Afshar
(74) Attorney, Agent, or Firm—Knobbe Martens Olson & Bear, LLP

(57) ABSTRACT

On embodiment of the system and method provides asymmetric adaptive modulation which allows uplink and downlink subframes of data to be transmitted between a base station and a CPE with different modulation schemes, thus increasing the efficiency of downlink transmissions while maintaining the stability of uplink transmissions. In systems with multiple CPEs, each CPE and base station pair can independently select their uplink and downlink modulation techniques. The system and method are also adaptive in that they adjust the modulation schemes based on, for example, signal to noise ratio measurements or bit error rate measurements.

27 Claims, 8 Drawing Sheets

U.S. PATENT DOCUMENTS

| | | | |
|---|---|---|---|
| 5,517,503 A | | 5/1996 | Hess |
| 5,615,212 A | | 3/1997 | Ruszczyk et al. |
| 5,638,371 A | * | 6/1997 | Raychaudhuri et al. .. 370/310.2 |
| 5,638,374 A | | 6/1997 | Heath |
| 5,663,990 A | | 9/1997 | Bolgiano et al. |
| 5,675,573 A | | 10/1997 | Karol et al. |
| 5,751,708 A | | 5/1998 | Eng et al. |
| 5,768,254 A | | 6/1998 | Papadopoulos et al. |
| 5,828,695 A | | 10/1998 | Webb |
| 5,859,619 A | | 1/1999 | Wu et al. |
| 5,890,055 A | | 3/1999 | Chu et al. |
| 5,909,469 A | * | 6/1999 | Frodigh et al. ............. 375/302 |
| 6,006,069 A | | 12/1999 | Langston |
| 6,016,311 A | | 1/2000 | Gilbert et al. |
| 6,016,313 A | | 1/2000 | Foster, Jr. et al. |
| 6,038,455 A | | 3/2000 | Gardner et al. |
| 6,049,566 A | | 4/2000 | Saunders et al. |
| 6,094,421 A | | 7/2000 | Scott |
| 6,112,080 A | | 8/2000 | Anderson et al. |
| 6,170,061 B1 | | 1/2001 | Beser |
| 6,363,241 B1 | | 3/2002 | Barakat et al. |
| 6,434,189 B1 | * | 8/2002 | Murphy ...................... 375/222 |
| 6,470,005 B1 | * | 8/2002 | Knutson et al. ............ 360/347 |

OTHER PUBLICATIONS

Ulm., et al., "Data–Over–Cable Interface Specifications, Radio Frequency Interface Specification", Hewlett Packard Interim Specification, Doc. Control No.: SP–RFII01–970321, published Mar. 21, 1997 by MCNS Holdings, L.P., Section 6, pp. 43–85.

Wolf et al., "On the Weight Distribution of Linear Block Codes Formed From Convolutional Codes", IEEE, IEEE Transactions on Communications, vol. 44:9, Sep. 1996.

"Asynchronous Transfer Mode (ATM) Technical Overview", $2^{nd}$ Edition, Prentice–Hall, Oct. 1995, Chapter 3, pp. 21–25.

Sampei, S. et al., Adaptive Modulation/TDMA Scheme for Personal Mulit–Media Communication Systems, (Nov. 28, 1994) Telecommunications Conference (Globecom), IEEE, pp. 989–993.

Ue, Toyoki et al., Symbol Rate and Modulation Level Controlled Adaptive Modulation/TDMA/TDD for Personal Communication Systems, (Jul. 25, 1995) Proceedings of the Vehicular Technology Conference, IEEE, vol Conf. 45 pp 306–310.

* cited by examiner

TIME FRAME A

TIME FRAME B

ASYMMETRIC ADAPTIVE MODULATION IN A WIRELESS COMMUNICATION SYSTEM

BACKGROUND OF THE INVENTION

1. Field of the Invention

The present invention relates to wireless communication systems and to a system and method for implementing asymmetric modulation in such systems.

2. Description of the Related Art

A wireless communication system facilitates two-way communication between a plurality of subscriber radio stations or subscriber units (fixed and portable) and a fixed network infrastructure. Exemplary communication systems include mobile cellular telephone systems, personal communication systems ("PCS"), and cordless telephones. The key objective of these wireless communication systems is to provide communication channels on demand between the plurality of subscriber units and their respective base stations in order to connect a subscriber unit user with the fixed network infrastructure (usually a wire-line system). In the wireless systems having multiple access schemes, a time "frame" is used as the basic information transmission unit. Each frame is sub-divided into a plurality of time slots. Some time slots are allocated for control purposes and some for information transfer. Subscriber units typically communicate with their respective base station using a "duplexing" scheme thus allowing for the exchange of information in both directions of the connection.

Transmissions from the base station to the subscriber units are commonly referred to as "downlink" transmissions. Transmissions from the subscriber units to the base station are commonly referred to as "uplink" transmissions. Depending upon the design criteria of a given system, the prior art wireless communication systems have typically used either time division duplexing ("TDD") or frequency division duplexing ("FDD") methods to facilitate the exchange of information between the base station and the subscriber units.

Recently, wideband or "broadband" wireless communications networks have been proposed for delivery of enhanced broadband services such as voice, data and video. These broadband networks facilitate two-way communication between a base station and a plurality of fixed subscriber units.

Often in such broadband communication systems, multiple schemes are available for modulating and demodulating the transmitted signal. The obvious choice for the modulation scheme is the one that allows the highest transfer bit rate between the base station and subscriber units. However, limitations imposed by the communication system's design as well as variations in geographic and atmospheric conditions impede use of such high-bandwidth modulation schemes. Furthermore, these variables impact transmissions from the base station to the subscriber unit and from the subscriber unit to the base station differently. Consequently, while it is advantageous for such broadband systems to continuously utilize high-bandwidth modulation schemes, in practice, they often do not.

Thus, there is a need for a system and method which can be implemented in a broadband communication system to optimize the transmission of voice, data and video when multiple modulation schemes are available. Such a system should be flexible so as to account for variations between both the uplink and the downlink in a two-way communication connection between each base station and subscriber unit pair. Moreover, a system that adaptively adjusts the modulation scheme for each individual uplink and downlink according to these variations over time would also be desirable.

SUMMARY OF THE INVENTION

One aspect is a wireless communication system for determining a plurality of uplink modulation schemes and a plurality of downlink modulation schemes for use in a wireless communication system including a base station and a plurality of customer premises equipment (CPE), where each of the plurality of uplink and downlink modulation schemes used by each of the plurality of CPE can be asymmetric, such that the uplink modulation scheme may be different than the downlink modulation scheme. The system comprises a plurality of CPE, each including a first modem configured to measure a first link quality based on received downlink data. The system further includes a base station having a second modem configured to measure a second link quality for each of the plurality of CPE based on received uplink data, a first processor configured to receive the first link quality and determine a downlink modulation scheme for each of the plurality of CPE, and a second processor configured to receive the second link quality and determine an uplink modulation scheme for each of the plurality of CPE.

Another aspect is a method for determining a plurality of uplink modulation schemes and a plurality of downlink modulation schemes for use in a wireless communication system which communicates with frames of data and includes a base station and a plurality of customer premises equipment (CPE), wherein each of the plurality of uplink and downlink modulation schemes used by each of the plurality of CPE can be asymmetric, such that the uplink modulation scheme may be different than the downlink modulation scheme. The method comprises determining an uplink quality for a first frame of data transmitted by a CPE and received by a base station, comparing the determined first uplink quality to a plurality of modulation threshold values. If the first uplink quality has crossed one of the plurality of modulation thresholds, a second uplink modulation scheme is selected for the CPE. The method further includes receiving a request for the second uplink modulation scheme at the CPE, determining a downlink quality for a second frame of data transmitted by the base station and subsequently received by the CPE, and comparing the determined first downlink quality to a second plurality of modulation threshold values. If the first downlink quality has crossed one of the plurality of modulation thresholds, a second downlink modulation scheme is selected for the CPE. The method further includes receiving a request for the second downlink modulation scheme at the base station, transmitting a third frame of data by the base station to the CPE using the second downlink modulation scheme, and transmitting a fourth frame of data by the CPE to the base station using the second uplink modulation scheme.

DETAILED DESCRIPTION OF THE PREFERRED EMBODIMENT

Embodiments of the invention will now be described with reference to the accompanying Figures, wherein like numerals refer to like elements throughout. The terminology used in the description presented herein is not intended to be interpreted in any limited or restrictive manner, simply because it is being utilized in conjunction with a detailed description of certain specific embodiments. Furthermore, embodiments may include several novel features, no single one of which is solely responsible for its desirable attributes or which is essential to practicing the embodiments herein described.

Figure 1:
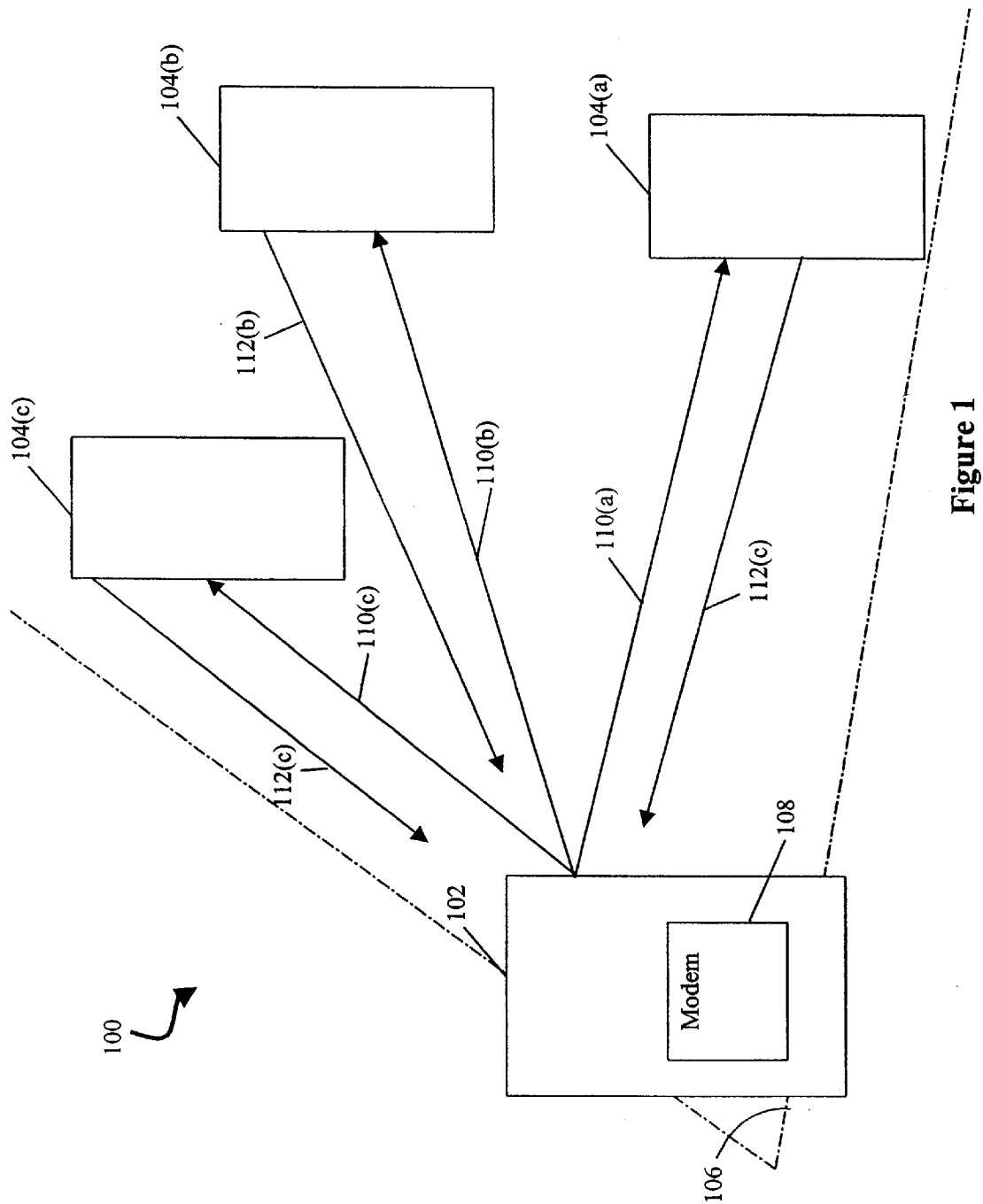
FIG. 1 is a simplified block diagram of a wireless communication system.

FIG. 1 is a block diagram of an exemplary wireless communication system 100. One exemplary broadband wireless communication system is described in U.S. Pat. No. 6,016,311, by Gilbert et al., issued Jan. 18, 2000, entitled "Adaptive Time Division Duplexing Method and Apparatus for Dynamic Bandwidth Allocation within a Wireless Communication System," hereby incorporated by reference. The system 100 includes a base station 102 and at least one customer premise equipment ("CPE") 104(a)–(c) receiving and transmitting data along wireless communication links 110(a)–(c), 112(a)–(c). CPE 104(a)–(c) are shown as examples which can include additional CPEs. FIG. 1 illustrates a system where three CPEs 104(a), 104(b), 104(c) are receiving and transmitting data with the base station 102 along communication link pairs 110(a) and 112(a), 110(b) and 112(b), 110(c) and 112(c).

The communication links 110(a), 110(b), 110(c) are referred to as downlinks (i.e., from the base station 102 to the CPE's 104) and can operate on a point (base station)-to-multi-point (CPE's) basis. Transmissions to and from the base station 102 are directional in nature, and thus are limited to a particular transmission sector 106 of the base station 102. Within a given sector 106, CPEs 104(a), 104(b), 104(c) receive the same transmission along their respective downlinks 110(a), 110(b), 110(c). To distinguish between data intended for a specific CPE, the CPEs monitor control information in their respective downlink 110(a), 110(b), 110(c) and typically retain only the data intended for them. In embodiments that have multiple sectors, the base station 102 includes a sectored active antenna array (not shown) which is capable of simultaneously transmitting to multiple sectors. In one embodiment of the system 100, the active antenna array transmits to four independent sectors simultaneously.

The communication links 112(a), 112(b), 112(c) are referred to as an uplink (i.e., from the CPEs 104 to the base station 102 and operate on a point-to-point basis. Thus, in FIG. 1, each CPE 104(a), 104(b), 104(c) originates its own uplink 112(a), 112(b), 112(c). Communication with the base station 102 is bidirectional and multiplexed on the basis of Time Division Duplexing (TDD). For a TDD transmission from, for example, CPE 104(a), CPE 104(a) would send its data along communication link 112(c) to the base station 102 during a preassigned time slot in a transmission frame. The specific frame structures of the uplink and downlink will be discussed further below.

In a Frequency Division Duplexing (FDD) system, duplexing of transmissions between the base station and the CPEs is performed in the frequency domain. Different sets of frequencies are allocated for uplink and downlink transmissions. In one embodiment, the system described herein is used in such an FDD system.

Each CPE is further coupled to a plurality of end users that may include both residential and business customers. Consequently, the end users have different and varying usage and bandwidth requirement needs. Each CPE 104(a)–(c) may service several hundred or more end users, but at least one end user will be assigned to transmit and receive data through each CPE 104.

The data transmitted along the communication links 110, 112 is in analog form, and thus a modem 108 is used to modulate the digital data prior to transmission. FIG. 1 illustrates the modem 108 being located at the base station 102, however, a similar or identical modem 108 may be used at the other end of the downlinks 110(a), 110(b), 110(c) to demodulate the received analog data. Thus, the modems 108 in the base station and each CPE are used for uplinking data from the CPEs to the base station and for downlinking data from the base station to the CPEs.

Still referring to FIG. 1, the broadband wireless communication system 100 provides "bandwidth-on-demand" to the CPEs. The CPEs request bandwidth allocations from their respective base station 102 based upon the type and quality of service ("QoS") requested by the end users served by each CPE. Each of the end users potentially uses a different broadband service having different bandwidth and latency requirements. To this end, the type and QoS available to the end users are variable and selectable. The amount of bandwidth dedicated to a given service can be determined by the information rate and the QoS required by that service (and also taking into account bandwidth availability and other system parameters). For example, T1-type continuous data services typically require a great deal of bandwidth having well controlled delivery latency. Until terminated, these services require constant bandwidth allocation for each frame. In contrast, certain types of data services such as Internet protocol data services ("TCP/IP") are bursty, often idle (which at any one instant may require zero bandwidth), and are relatively insensitive to delay variations when active.

In one embodiment, the communication system modulates transmitted data according to the common capabilities of the CPEs 104 and the base station 102. The most robust modulation scheme is used as the modulation scheme for all data transmitted to and received from the base station 102. If such a system was applied to FIG. 1, a single modulation scheme would be selected for the communication links 110(a), 110(b), 110(c), 112(a), 112(b), 112(c). Often, the most robust modulation is the most stable, but the transmitted data is the least dense. For example, if CPEs 104(a), 104(b) are capable of receiving quadrature amplitude modulation-64 ("QAM-64") data, but CPE 104(c) is only capable of receiving quadrature phase shift keying ("QPSK") modulated data, both uplinks 112(a), 112(b), 112(c) and downlinks 110(a), 110(b), 110(c) would be transmitted using QPSK modulation. This creates an inefficient use of bandwidth whenever QPSK modulated data is transmitted to a QAM-64 capable CPE or base station.

In another embodiment, modulation schemes are selected for each CPE 104(a), 104(b), 104(c) and base station 102 pair. Transmission quality varies for each CPE as a function of the characteristics of the pathway (i.e. geographic, atmospheric . . . ) between the CPE and the base station. Thus, the selected modulation schemes may be different for the CPEs depending on the capabilities and transmission quality of each CPE 104(a), 104(b), 104(c) and base station 102 pair. Continuing with the previous example, since CPEs 104(a), 104(b) are capable of receiving QAM-64 data coupled with adequate transmission quality between CPEs 104(a), 104(b) and the base station 102, all data transmitted between these CPEs and the base station will be modulated using QAM-64. In the same system CPE 104(c), which is only capable of receiving QPSK data, will only transmit and receive QPSK data. By using different or variable modulation schemes for different CPEs associated with a single base station, the communication system 100 as a whole increases its bandwidth utilization.

The transmission quality between the base station 102 and specific CPEs 104 may not only vary between each CPE and base station pair as described above, but may also vary over time. For example, in FIG. 1, the transmission quality may significantly decrease during a rain or snowstorm. When the link quality is decreased, there is an increased chance that transmitted data along communication links 110(a), 110(b), 110(c), 112(a), 112(b), 112(c) may be unrecognizable or lost to the receiving base station or CPE. To accommodate these time variations in link quality, one embodiment of the communication system 100 dynamically adjusts or "adapts" the modulation scheme for each base station 102 and CPE 104 pair. In such an adaptive system, the bandwidth utilization of the communication system 100 further increases.

An additional embodiment of the communication system 100 selects different modulation schemes for the uplink and downlink between each base station and CPE pair. Rather than selecting the same modulation scheme for the uplink and downlink associate with a CPE, the communication system selects the uplink and downlink modulations independently. Such a communication system is said to operate asymmetrically. In still another embodiment, the communication system 100 combines the features described above to provide an asymmetric and adaptive communication system 100.

In many of the embodiments described above, a determination as to the quality of the each communication link is used to select a modulation scheme. This determination can be made once for each communication link 110(a), 110(b), 110(c), 112(a), 112(b), 112(c) or can be made dynamically in an adaptive communication system. In one of these embodiments, a Signal to Noise Ratio ("SNR") of a received signal (either by the base station 102 or CPE 104) is used in determining the modulation scheme that the communication system should employ. SNR is a measure of signal strength relative to background noise. The ratio is usually measured in decibels (dB), such that if the incoming signal strength in microvolts is $V_s$, and the noise level, also in microvolts, is $V_n$, then the SNR in decibels is given by the formula $$SNR=20\log_{10}(V_s/V_n)$$

If $V_s = V_n$, then SNR=0. In this situation, the analog signal borders on unreadable, because the noise level severely competes with it. In digital communications, this will likely cause a reduction in data speed because of frequent errors that require the transmitting base station or CPE to re-send some lost data. Ideally, $V_s$ is much greater than $V_n$, so SNR is positive. For example, suppose that $V_s$=10.0 microvolts and $V_n$=1.0 microvolt. Then $$SNR=20\log_{10}(10)=20.0 \text{ dB}$$

which results in a very clear signal. If the signal is much weaker but still above the noise level, for example, 1.3 microvolts, then $$SNR=20\log_{10}(1.3)=2.28 \text{ dB}$$

which may result in a reduction in data speed under these conditions.

During each frame, base station 102 receives transmissions from each of the CPEs 104(a), 104(b), 104(c) in turn. This requires the base station to synchronize with each sequential CPE "on the fly." In contrast, each CPE synchronizes with each downlink frame at the beginning of the frame. Once synchronized, the CPE maintains its connection until the specific data intended for it is received. As such, the synchronization activity required of the base station is a multiple of each individual CPE's synchronization activity. Thus, the base station may have difficulty in receiving data from multiple CPEs that use a more dense modulation scheme.

Figure 2:
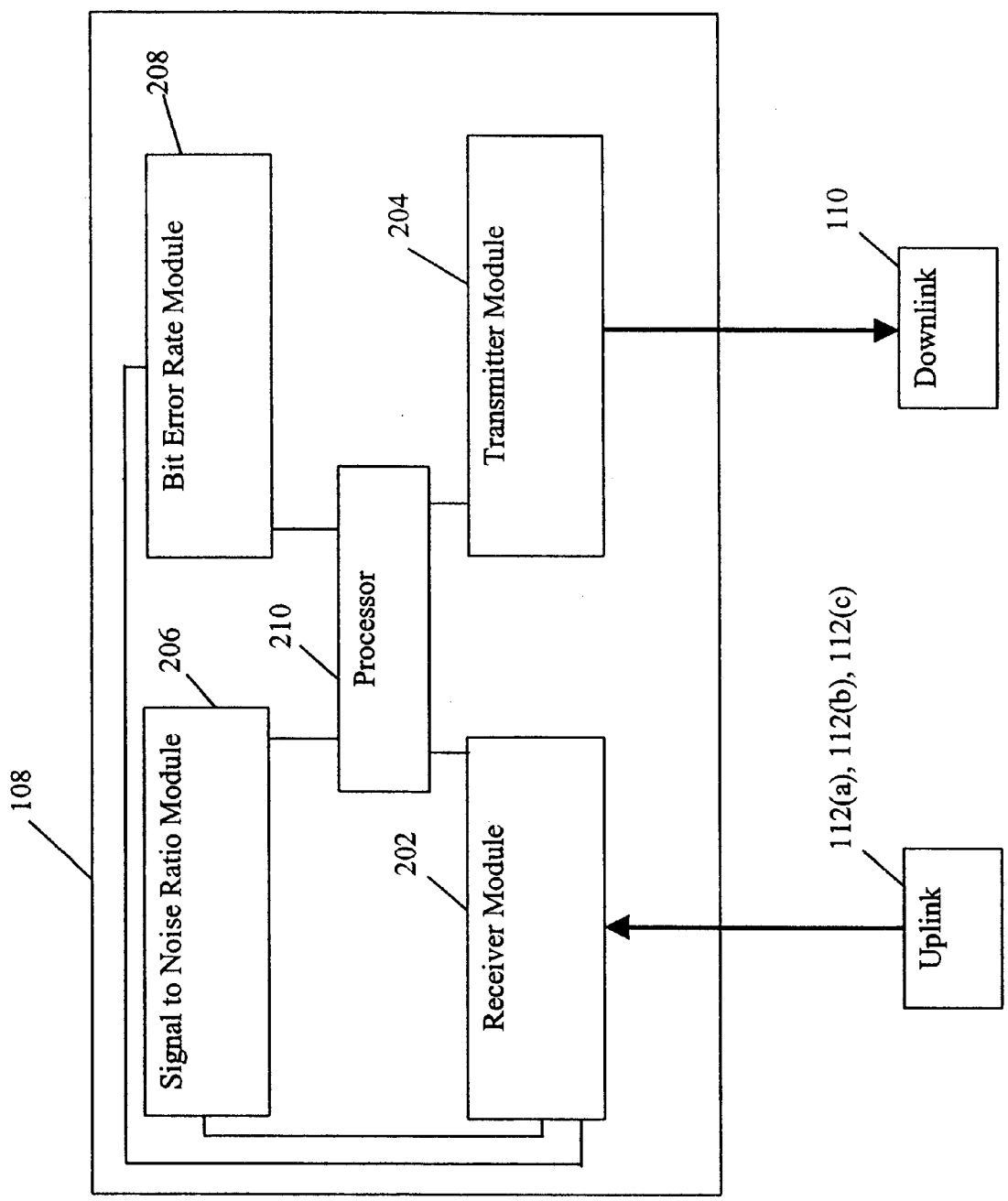
FIG. 2 is a block diagram of a Time Division Duplex ("TDD") modem.

FIG. 2 is a block diagram of a Time Division Duplex ("TDD") modem 108 used to modulate/demodulate data in the wireless communication systems 100 described above. Modems 108 are used by the base station 102 and CPEs 104 to modulate and demodulate data. For ease of description, the modem 108 will now be described with reference to the base station 102. One embodiment of the modem 108 includes a receiver module 202, a transmitter module 204, a signal to noise ratio ("SNR") module 206, and a bit error rate ("BER") module 208. In another embodiment, the modem 108 further includes a processor 210. In operation, the transmitter module 204 converts digital data to an appropriately modulated analog signal communicated as a downlink 110, using for example, quadrature amplitude modulation ("QAM") or quadrature phase shift keying ("QPSK") modulation. The analog signal may also be up converted to a carrier frequency prior to transmission. The receiver module 202 demodulates an uplink 112(a), 112(b), 112(c) and converts it back to its original digital form.

The transmitter module 204 controls the data modulation scheme(s) for the modem 108. The transmitter module 204 interfaces with the SNR module 206 and the BER module 208 in selecting the modulation scheme used to transmit the data. The SNR module 206 can be a transceiver (not shown) configured to measure the signal to noise ratio of the received signal. Alternatively, the SNR module 206 can be a power detector (not shown) configured to measure the signal to noise ratio of the received signal. The SNR can be calculated from the bit error rate determined by the BER module 208.

The processor 210 is configured to monitor signal quality of the received signal. An example metric used by the processor to monitoring signal quality is a SNR. Signal quality is measured over a period of time, and, in response to changes in the signal quality, the processor 210 determines if the modulation should be changed. This helps avoid cyclic changes in the modulation scheme due to transient changes in the communication link's quality. In one embodiment, only the modem 108 at the base station 102 includes the processor 210. In this embodiment, each CPE measures its own signal quality and transmits its value within its uplink 112 to the base station 102. The processor 210 is then able to monitor the signal quality of the CPEs to determine if the downlink 110 modulation schemes should be changed. In one embodiment, the processor 210 in the base station 102 monitors its own signal quality to determine if the uplink 112 modulation should be changed.

The term "module," as used herein, means, but is not limited to, a software or hardware component, such as a FPGA or ASIC, which performs certain tasks. A module may advantageously be configured to reside on the addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. Additionally, the components and modules may advantageously be implemented to execute on one or more computers within the communication system.

Figure 3:
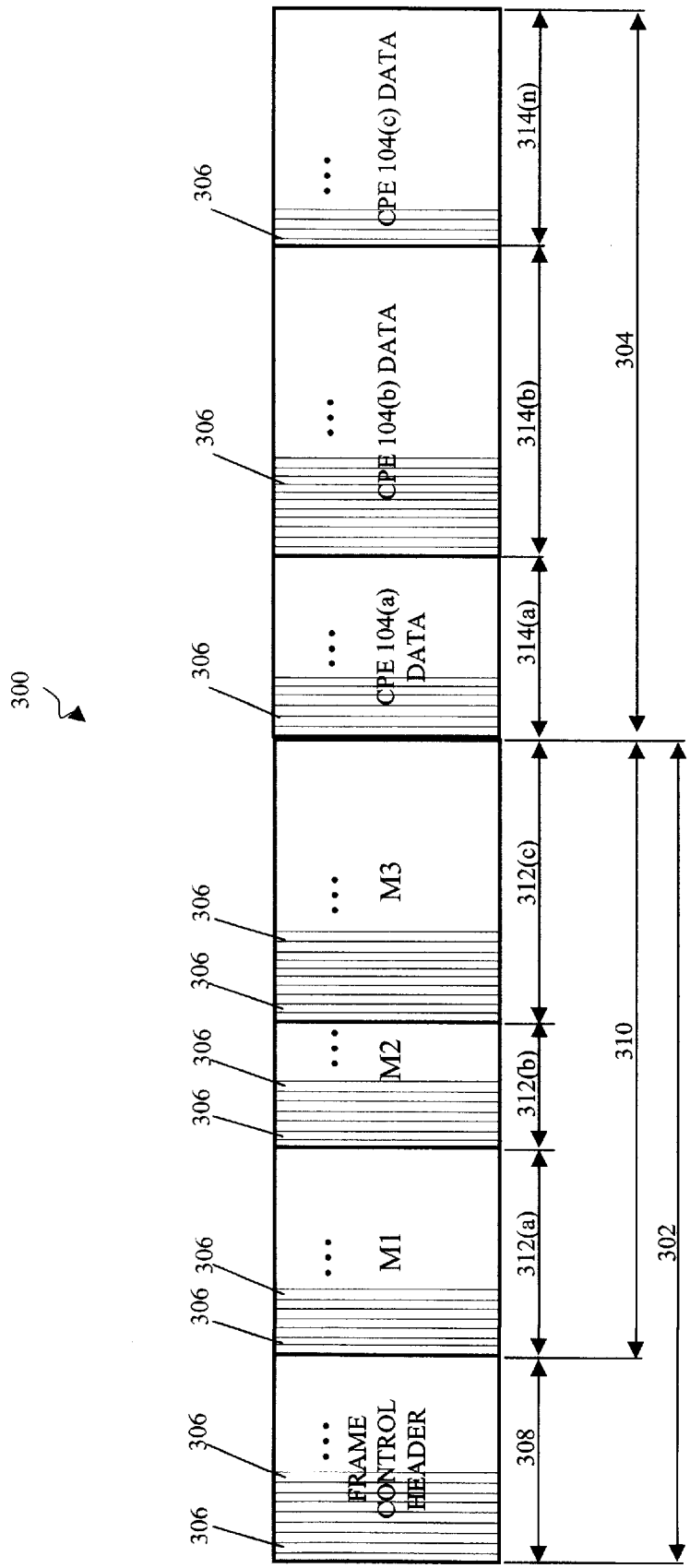
FIG. 3 is an illustration of the structure of a TDD frame.

FIG. 3 represents a time division duplexing ("TDD") frame and multi-frame structure for use in communication system 100. Frame 300 includes a downlink subframe 302 and an uplink subframe 304. The downlink subframe 302 is used by the base station 102 to transmit information to the plurlaity of CPEs 104(a)–(c). In any given downlink subframe 302, all, some, or none of the transmitted information is intended for a specific CPE 104. The base station 102 may transmit the downlink subframe 302 prior to receiving the uplink subframe 304. The uplink subframe 304 is used by the CPEs 104(a)–(c) to transmit information to the base station 102.

Subframes 302, 304 are subdivided into a plurality of physical layer slots (PS) 306. Each PS 306 correlates with a duration of time. In the embodiment shown in FIG. 3, each subframe 302, 304 is one-half millisecond in duration and includes 400 PS for a total of 800 PS per frame 300. Alternatively, subframes having longer or shorter durations and with more or fewer PSs can be used.

Each downlink subframe 302 comprises a frame control header 308 and downlink data 310. The frame control header 308 includes information for the CPEs to synchronize with the base station 102. In one embodiment, the frame control header 308 includes control information indicating where modulation changes occur in the downlink. The frame control header 308 can also include a map of the subsequent uplink subframe 304 that is to be transmitted by the CPEs 104. This map allocates the PSs 306 in the uplink subframe 304 between the different CPEs. The frame control header 308 can further include a map of attributes of the downlink data 310. For example, attributes may include, but are not limited to, the locations of the PSs 306 in the subframe 302 that are intended for each individual CPE.

The downlink data 310 is transmitted in a pre-defined modulation or a sequence of modulation techniques M1, M2, M3. Individual or groups of PSs 306 in the downlink subframe 302 are assigned to data intended for specific CPEs 104. For example, the base station 102 could assign PSs in one, some, or all of the modulation techniques M1, M2, M3 for transmitting data to CPE 104(a). In FIG. 3, the data is divided into three modulations types, where QPSK (312(a)) is the most robust modulation (i.e. least prone to transmission errors caused by signal interference) and while QAM-64 (312(c)) is the least robust (i.e. most prone to transmission errors caused by signal interference). In between these modulation schemes is QAM-32 (312(b)). In one embodiment, a sequence such as: QAM-4, followed by QAM-16, followed by QAM-64 is used. In other embodiments, additional modulation schemes, such as QAM-256, are used. Each CPE 104 monitors the downlink data 310 and retains only those messages intended for them. As mentioned above, in one embodiment, attributes in the frame control header 308 provide this information to the CPEs.

Still referring to FIG. 3, the uplink subframe 304 comprises uplink data 314(a)–(n). The uplink subframe 304 is used by the CPEs 104(a)–(c) to transmit information to the base station 102. The subframe 304 is subdivided into a plurality of PSs 306. Each CPE 104(a)–(c) transmits its information during its allocated PS 306 or range of PSs 306. In one embodiment, the PSs 306 allocated for each CPE are grouped into a contiguous block of a plurality of data blocks 314(a)–(n). In this embodiment, the CPEs use data blocks 314(a)–(n) to transmit the uplink subframe 304. The range of PSs 306 allocated to each block in the plurality of data blocks 314(a)–(n) is selected by the base station 102.

The data transmitted in each data block 314(a)–(n) is modulated by the transmitting CPE. For example, CPE 104(a) modulates data block 314(a). During its data block, the CPE transmits with a fixed modulation that is selected by the base station 102 based on the SNR and/or BER of its prior transmission(s) to the base station 102. In an alternate embodiment, a sequence of modulation techniques is used in each data block 314(a)–(n). In still another embodiment, the data blocks 314(a)–(n) are grouped by modulation scheme. As mentioned above, one embodiment of the uplink subframe 304 includes SNR and/or BER measurements transmitted by the CPEs for the base station to use in determining if the modulation of the downlink subframe 302 should be changed.

Each CPE 104 receives all downlink transmissions that are modulated using its current modulation scheme or are modulated using a more robust modulation scheme than its current modulation scheme. The frame control header 308 is typically modulated using the most robust modulation scheme to ensure that all CPEs 104(a)–(c) may receive it. Because each CPE receives the frame control header, each CPE 104 is initially synchronized with the downlink subframe 302 at the beginning of the frame 300. The downlink subframe is sorted by robustness, which allows each CPE to maintain synchronization during the subsequent portion of the downlink that could include data for that CPE. Data that is modulated using a less robust modulation scheme than a CPE's current modulation scheme is not listened to by that CPE. Thus, once synchronized, each CPE maintains its connection throughout the portion of the downlink subframe 302 that was modulated using a modulation scheme that is at least as robust as that CPE's current scheme. Since the CPEs are initially synchronized with the downlink subframe, when the data addressed to each specific CPE 104 is transmitted the respective CPEs 104 do not need additional time to synchronize.

In contrast, the base station 102 receives data from the CPEs 104 during subframe 304 which requires the base station 102 to synchronize with each individual CPE 104. Synchronization with each CPE 104 may take a variable amount of PSs 306 to achieve. Thus, the synchronize time needed for the base station 102 to synchronize with multiple CPEs 104(a)–(c) is a multiple of each individual CPE's synchronization activity during the downlink subframe 302. As such, the base station 102 may not be capable of receiving data at the same modulations as individual CPE's 104. In some embodiments the base station 102 may be able to receive uplink data at a higher modulation than CPEs 104 can receive downlink data.

Figure 4:
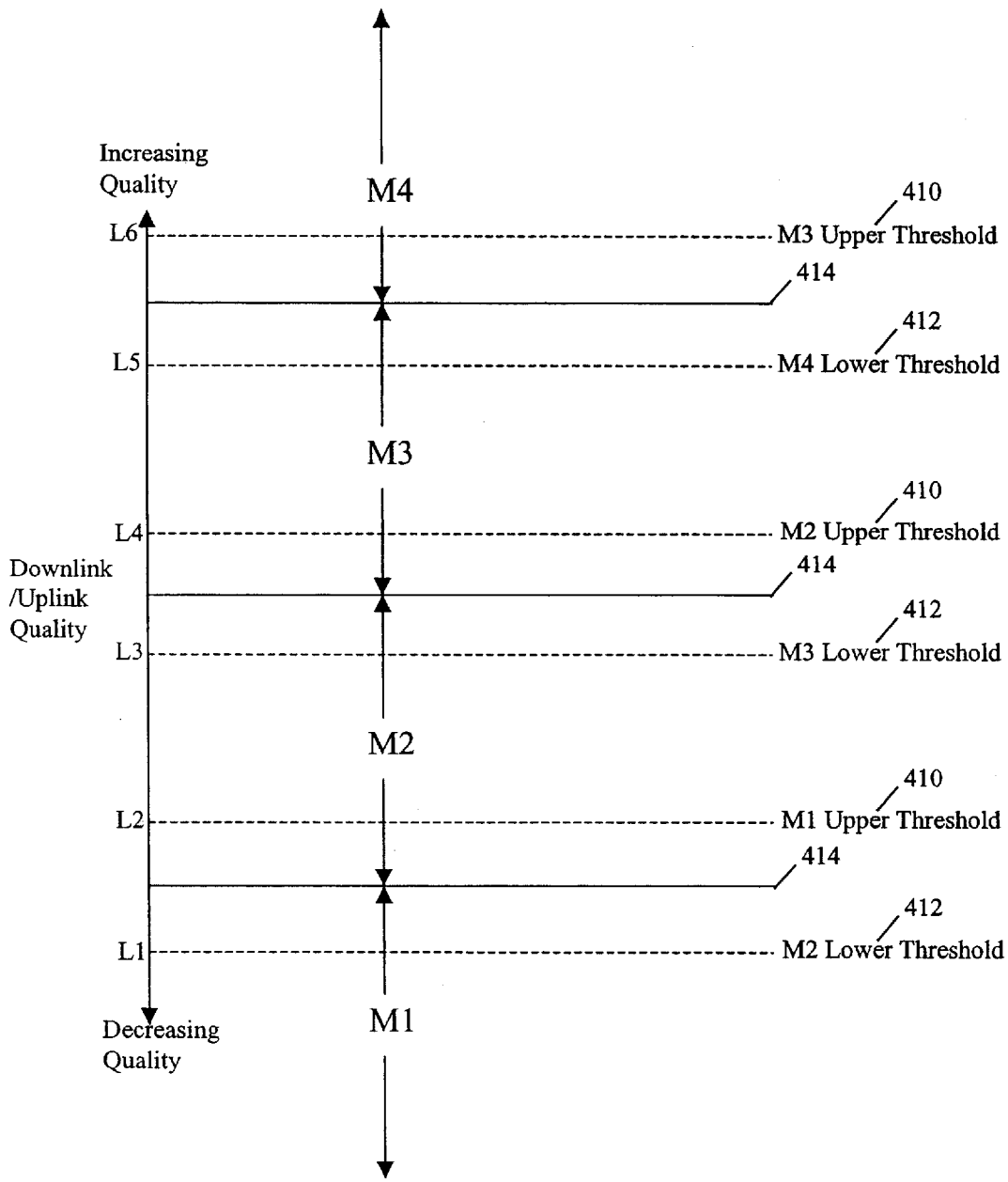
FIG. 4 is a graph of multiple modulation techniques, M1–M4, and their respective upper and lower modulation thresholds.

FIG. 4 illustrates a graph of four modulation schemes and their respective upper and lower modulation thresholds. Specifically, four modulation schemes (M1–M4, where M1 is the most robust and M4 is the least robust), and six modulation thresholds (L1–L6, where L1 indicates the lowest link quality and L6 indicates the highest link quality) are shown. Lines 414 separate the modulation schemes of FIG. 4 and are based on a defined relationship between link quality and modulation schemes. In one embodiment, the thresholds L1–L6 are identical for the uplink and downlink, such that modulation transition points are the same for both the uplink and the downlink. The thresholds are based on measurements of the quality of a communication link between a transmitting base station 102 or CPE 104(*a*)–(*c*) and a receiving CPE or base station. Quality measurements are made for the uplinks 112(*a*)(*c*) and downlinks 110(*a*)–(*c*) in FIG. 1. In one embodiment, the link quality is based on a SNR or BER measurement for the uplink or downlink. Alternatively, link quality is determined by measuring the carrier to noise ration (C/N) or the carrier to noise plus interference ratio (C/(N+I)). For ease of description, the following assumes the modulation thresholds for the uplink and downlink are the same. The following description would then apply to both the uplink and downlink. However, in alternate embodiments, the modulation thresholds for the uplink and downlink are different. For example, the upper and lower thresholds for the uplink 112 may be shifted by a fixed amount from the corresponding upper and lower thresholds for the downlink 110.

Still referring to FIG. 4, modulation schemes M2 and M3 each have a pair of modulation thresholds associated thereto. Modulation schemes M1 and M4 each have a single threshold associated thereto since they are the minimum and maximum modulation schemes available in the embodiment of FIG. 4. The modulation thresholds include upper thresholds 410 and lower thresholds 412. In one embodiment, as the downlink/uplink quality exceeds the upper threshold 410, the modulation scheme is increased. This is accomplished by selecting a denser and less robust modulation scheme. Conversely, as the lower threshold 412 is crossed, the modulation scheme is decreased. For example, thresholds L1 and L4 are the thresholds for modulation scheme M2. If the downlink/uplink quality using M2 falls below L1, the receiving base station/CPE will initiate changing the modulation technique to M1. Alternatively, if the downlink/uplink quality using M2 rises above L4, the receiving base station/CPE will initiate changing the modulation technique to a higher type, for example, M3. Continuing with this example, if the modulation is changed to M3 because the downlink/uplink quality exceeded L4 and then the downlink/uplink quality decreases below L4, M3 will continue to be used until L3 (the M3 lower threshold) is crossed. In other words, in order for a modulation scheme to decrease, the link quality must decrease not just to line 414, but to the lower threshold 410 immediately below line 414. Likewise, in order for a modulation scheme to increase, the link quality must not only exceed line 414, but also must exceed the upper threshold 410 immediately above line 414. By spacing the upper and lower thresholds in this manner, the likelihood of rapid changes occurring between modulation schemes is decreased.

Figure 5:
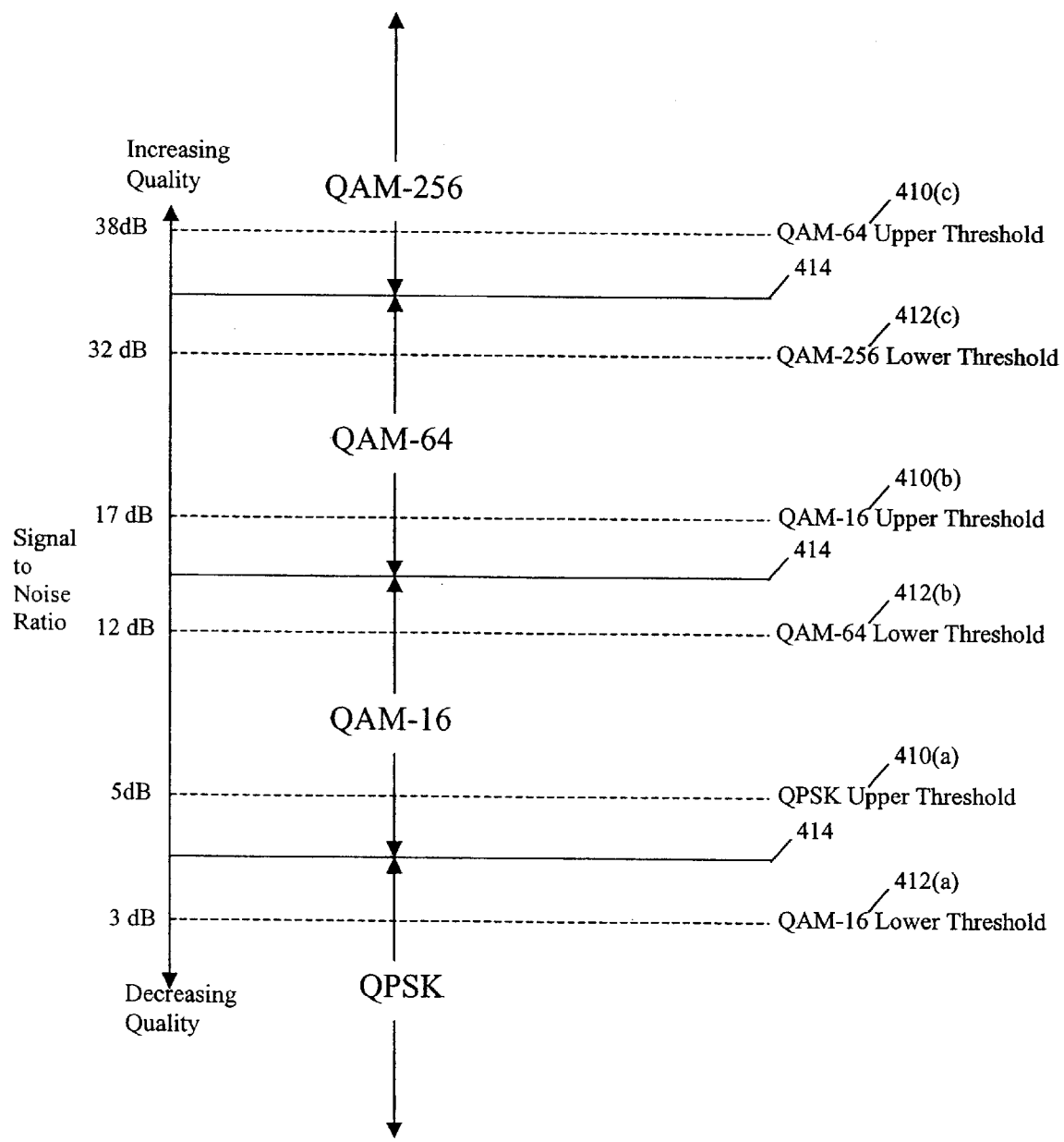
FIG. 5 is a graph showing modulation techniques QAM-256, QAM-64, QAM-16, and QPSK with upper and lower signal to noise ratios ("SNR") thresholds.

FIG. 5 is one embodiment where modulation techniques QAM-256, QAM-64, QAM-16, and QPSK are selected along with their respective upper and lower modulation thresholds for measurements of signal to noise ratios ("SNR"). The modulation thresholds for QAM-64 transmissions are QAM-64 upper threshold 410(*c*) and QAM-64 lower threshold 412(*b*). For example, if a base station 102 is currently downlinking data to a specific CPE 104(*a*) using QAM-64 modulation, the modulation scheme will change when the downlink 110(*a*) quality goes above upper threshold 410(*c*), for example, at 38 dB. Likewise, when the downlink 110(*a*) quality goes below lower threshold 412(*b*), for example, at 12 dB. Furthermore, the modulation scheme will not be changed when link quality crosses either QAM-256 lower threshold 412(*c*) or QAM-16 upper threshold 410(*b*) because they are not current modulation thresholds for QAM-64. This limits rapid changes between adjacent modulation schemes caused by small fluctuations in downlink quality around an upper or lower threshold.

Figure 6A:
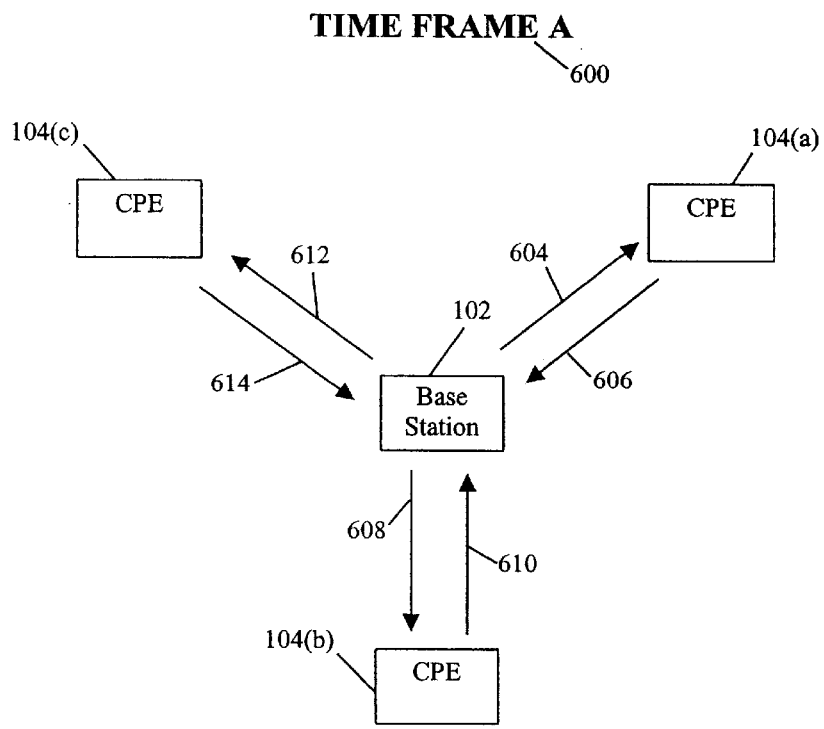
FIGS. 6a and 6b illustrate asymmetric adaptive modulation being performed by the base station and CPEs from FIG. 1.
Figure 6B:
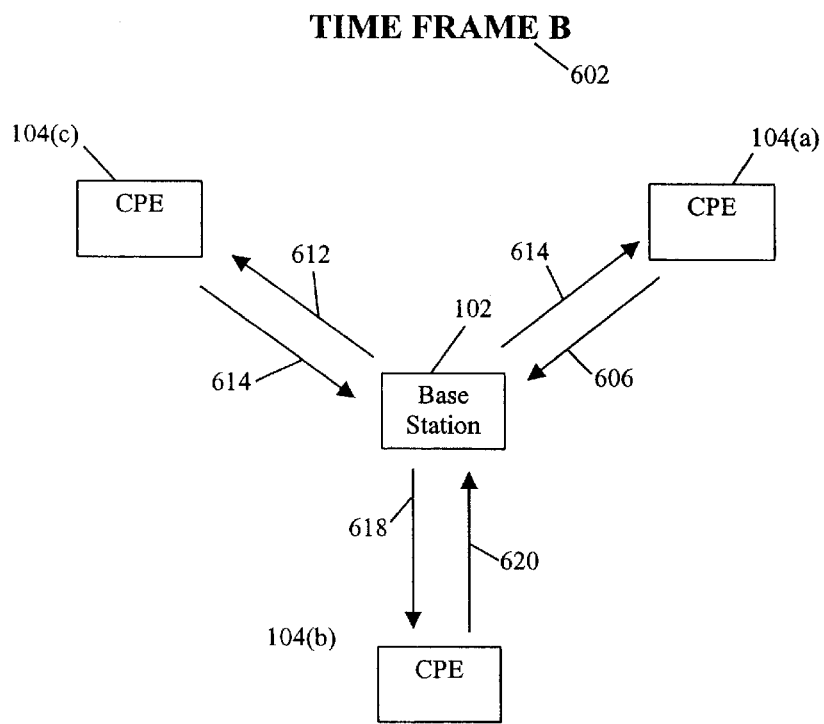

FIGS. 6*a* and 6*b* illustrate asymmetric adaptive modulation being performed by the base station and CPEs from FIG. 1 during two different time frames, time frame A 600 and time frame B 602. FIGS. 6*a* and 6*b* illustrate how the uplink and downlink modulations used by a base station 102 and the specific CPEs 104 are asymmetrically adaptive. In one embodiment, time frame B 602 directly follows time frame A 600. In another embodiment, time frame B 602 occurs at a later time than time frame A 600.

In time frame A 600, as shown in FIG. 6A, CPE 104(*a*) receives downlink 110(*a*) (see FIG. 1) modulated at QAM-16 604 from base station 102. CPE 104(*a*) transmits uplink 112(*c*) (see FIG. 1) modulated at QPSK 606. The qualities for the uplink 112(*c*) and downlink 110(*a*) may be different due to several factors. For example, performing multiple synchronizations by the base station 102 may affect these qualities. Additionally, because multiple CPE's 104(*a*)–(*c*) typically transmit to base station 102 during a frame 300 (see FIG. 3), the base station may receive interference between the signals from the multiple CPEs. Additionally, there may be other interference sources that only effect data transmission in only one direction. For example, co-channel and adjacent channel interference from neighboring cells or sectors can cause the link quality for an uplink to be different than the link quality for the downlink. In subsequent time frame B 602, the downlink 110(*a*) modulation scheme from the base station 102 is increased to QAM-64 614 while the uplink 112(*c*) modulation scheme from CPE 104(*a*) remains at QPSK 606. This occurs because the quality of the downlink 110(*a*) has increased beyond an upper threshold 410(*b*) (see FIG. 5) between time frame A 600 and time frame B 602. The quality of the uplink 112(*c*) has not crossed the QPSK upper threshold 410(*a*) (see FIG. 5), and thus the uplink 112(*c*) continued using QPSK 606.

Returning to time frame A 600, CPE 104(*b*) receives downlink 110(*b*) (see FIG. 1) modulated at QAM-64 608 and transmits an uplink 112(*b*) (see FIG. 1) modulated at QAM-16 610. Between time frame A 600 and time frame B 602, the quality for both the uplink and downlink crossed over a lower threshold 412(*b*), 412(*a*) as evidenced by the more robust modulation schemes in time frame B 602. In time frame B, the downlink 110(*b*) is in QAM-16 618 while uplink is in QPSK 620. Since the modulation schemes of both links have decreased, this may have occurred due to changes in weather conditions between the base station 102 and CPE 104(*b*).

Returning once again to time frame A 600, CPE 104(*c*) receives downlink 110(*c*) (see FIG. 1) modulated at QAM-16 612 and transmits uplink 112(*c*) (see FIG. 1) modulated at QAM-16 614 to the base station 102. In time frame B 602, both the uplink and downlink are still using QAM-16 612, 614 modulations. The link qualities of both the uplink 112(c) and downlink 110(c) between base station 102 and CPE 104(c) have not crossed either an upper threshold 410(b) or a lower threshold 412(a).

Figure 7:
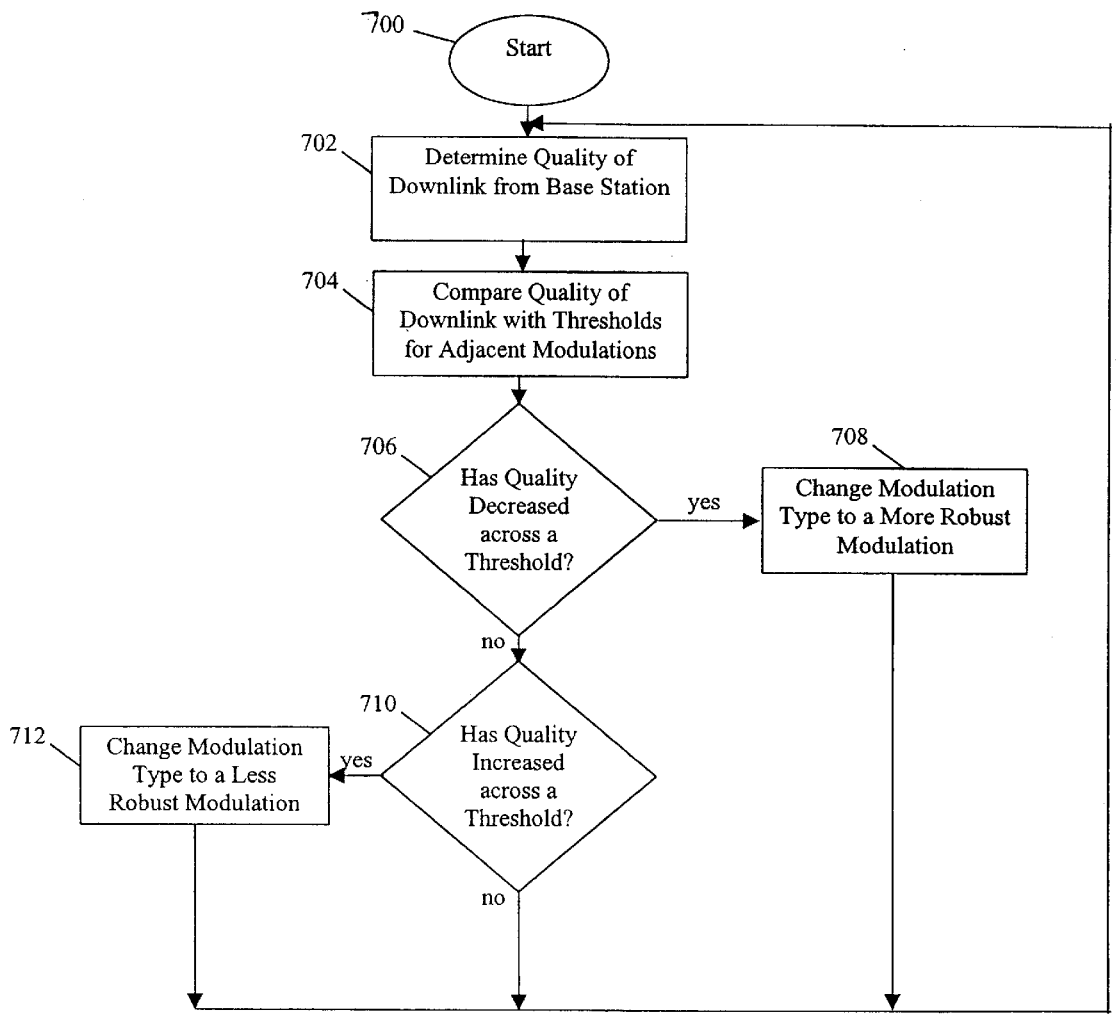
FIG. 7 is a flowchart illustrating the base station performing the process of adaptively adjusting the downlink modulation scheme.

FIG. 7 is a flowchart illustrating a process for adaptively adjusting the downlink modulation scheme. The base station can adjust its downlink modulation for a specific CPE 104 independent of that CPE's uplink modulation. In one embodiment, the process is performed during each frame 300 (one millisecond, for example), or periodically over several frames (every 10 seconds, for example). The base station 102 performs the process for each CPE 104(a)–(c) within a sector 106 (see FIG. 1). In another embodiment, each CPE determines the quality of the downlink. Once determined, the CPE can report the quality information back to the base station or determine itself whether the downlink modulation should be adjusted. If the CPE determines that the downlink modulation should be adjusted based on its quality measurements, the CPE sends a request to the base station to use a different modulation technique. The base station is then able to adjust its downlink modulation accordingly for the specific CPE.

In particular, flow begins in start block 700. Flow proceeds to block 702, where the quality of the downlink 110 from the base station 102 is determined. The quality of the downlink may be a function of the state of the transmission medium (e.g. air, foggy air, wet air, smoky air, etc.) and the ability of both the transmitting and receiving components (e.g. base station 102 and CPE 104) to respectively transmit and receive data. In one embodiment, each CPE 104(a)–(c) determines the quality of its respective downlink 110(a)–(c). In another embodiment, the quality of the downlink 110 is determined by only one CPE 104. In this embodiment, the selected CPE 104 can be geographically located near the other CPEs 104 that receive the downlink 110 using the same modulation scheme. In still another embodiment, the CPEs 104 periodically transmits measurements, which are indicative of the quality of their respective downlink 110, to the base station 102. The base station 102 then uses these measurements to determine the quality of its downlink. These measurements can include SNR and/or BER measurements of the downlink 110(a)–(c). For example, CPE 104(a) determines the quality of its downlink 10(a) based on a measurement by its BER module 208 (see FIG. 2). A single BER measurement or a series of several BER measurements taken by the CPE during a frame 300 (see FIG. 3) or during multiple frames may be used to determine the downlink quality. In embodiments where the CPE include a processor 210 (see FIG. 2), multiple measurements are analyzed by the processor 210 to determine the downlink's quality. For example, BER measurements may be averaged over N frames 300 to generate the downlink quality measurement. In one embodiment, CPE 104(a) transmits its measurements to the base station 102 for analysis by a processor 210 in the base station. The base station then determines the quality of the downlink for CPE 104(a).

Continuing to block 704, the base station or CPE compares the calculated downlink quality with the current modulation thresholds, as shown in FIGS. 4 and 5. The current modulation thresholds are an upper threshold 410 and a lower threshold 412 at which the modulation scheme is changed. With reference to FIG. 5, the current modulation thresholds for a QAM-64 transmission are QAM-64 upper threshold 410(c) and QAM-64 lower threshold 412(b). For example, if the base station 102 is currently downlinking data to CPE 104(b) using QAM-64 modulation, the modulation scheme will change when the uplink quality exceeds the upper threshold 410(c) at 38 dB or goes below lower threshold 412(b) at 12 dB. Furthermore, the modulation scheme will not be changed when link quality crosses either QAM-256 lower threshold 412(c) or QAM-16 upper threshold 410(b) because they are not current modulation thresholds.

Next at decision block 706, the base station determines whether the downlink quality has decreased and crossed a modulation lower threshold 412 (see FIG. 4) according to the comparisons made in block 704. With reference to FIG. 5, when the modulation is QAM-256 the current modulation lower threshold 412(c) is 32 dB. For QAM-64, the current modulation lower threshold 412(b) is 12 dB. For QAM-16, the current modulation lower threshold 412(a) is 3 dB. If the current modulation lower threshold has been crossed, flow proceeds to block 708 where the base station selects a more robust modulation. In embodiments where the CPE determines the downlink quality and compares it to the modulation threshold, the CPE 104 can send a request to the base station 102 indicating a desired downlink modulation change. This request is sent during the uplink subframe. Once received by the base station 102, a downlink modulation change confirmation is transmitted to the CPE 104 indicating in which frame 300 the change will occur. In another embodiment, a confirmation message is not transmitted to the CPE 104, but instead the CPE 104 listens for its data at both the current modulation and the requested, more robust, modulation. Because the CPEs 104 receive all data transmitted by the base station 102, a change in modulation will be evident to a specific CPE 104 when data is received in the requested modulation scheme. Flow then returns to block 702.

Returning to decision block 706, if a current modulation lower threshold has not been crossed, flow proceeds to decision block 710 where the base station determines whether the downlink quality has crossed an upper modulation threshold 410. With reference to FIG. 5, when the current modulation is QAM-64 the current modulation upper threshold 410(c) is 38 dB. For QAM-16, the current modulation upper threshold 410(b) is 17 dB. For QPSK, the current modulation upper threshold 410(a) is 5 dB. If the base station determines that the current modulation upper threshold has been exceeded, flow continues to block 712 where the modulation scheme is changed to a less robust, denser modulation. In embodiments where the CPE determines the downlink quality and compares it to the modulation threshold, the CPE 104 sends a request to the base station 102 indicating a desired downlink modulation change. Once received by the base station 102, a downlink modulation change confirmation is transmitted to the CPE 104 indicating in which frame 300 the change will occur. In another embodiment, a confirmation message is not transmitted to the CPE 104, but instead the CPE 104 listens for its data at both the current modulation and the requested, more robust, modulation. Because the CPEs 104 receive all data transmitted by the base station 102, a change in modulation will be evident to a specific CPE 104 when data is received in the requested modulation scheme. Flow then returns to block 702.

Returning to decision block 710, if the downlink quality has not exceeded the upper modulation threshold 610, flow proceeds to block 702.

Figure 8:
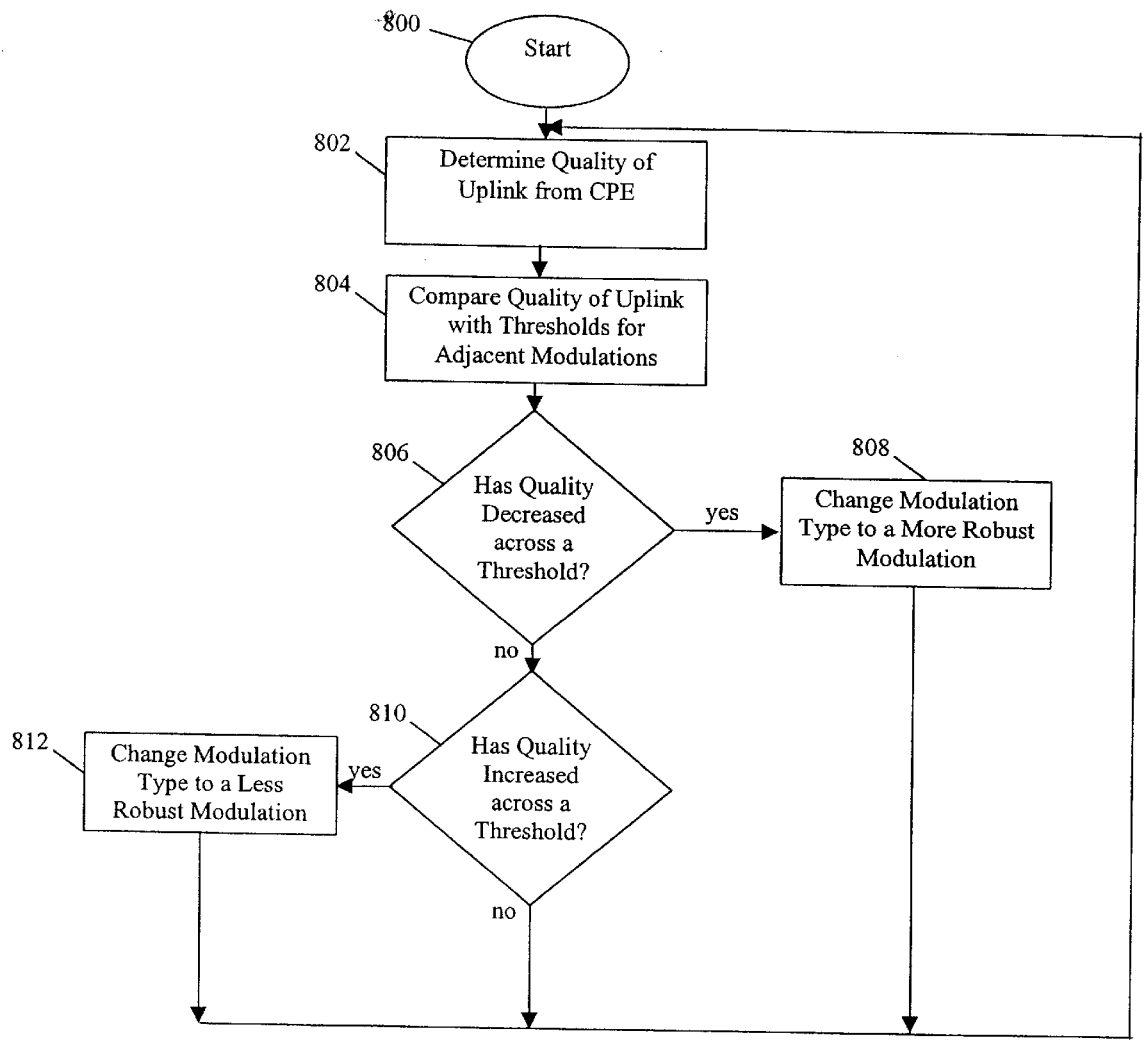
FIG. 8 is a flowchart illustrating the CPE performing the process of adaptively adjusting the uplink modulation scheme.

FIG. 8 is a flowchart illustrating the process of adaptively adjusting uplink modulation scheme. A specific CPE's 104 can change its uplink modulation independent of that CPE's 110 downlink modulation. The specific CPE's modulation can also be independent of the uplink modulation schemes used by other CPEs 104 within the same sector 106. Because the base station 102 must synchronize with each individual CPE 104 that uplinks data, the uplink quality may be different than the downlink quality with a specific CPE 104. In one embodiment the base station 102 performs the process to adaptively adjust the uplink modulation scheme used by a specific CPE 104. As such, a similar process may be completed for each CPE 104 within the sector 106 in order to adaptively adjust each CPEs 104 uplink modulation.

In particular, flow begins in start block 800. Flow proceeds to block 802, where the quality of the uplink 112 from a CPE 104 to a base station 102 is determined. The quality of the uplink may be a function of the state of the transmission medium (e.g. air, foggy air, wet air, smoky air, etc.) and the ability of both the transmitting and receiving components (e.g. CPE 104 and base station 102) to respectively transmit and receive data. In one embodiment, the base station 102 determines the quality of each uplink 112(a)–(c). In another embodiment, the base station 102 periodically transmits measurements, which are indicative of the quality of a CPE's uplink 112, to that CPE 104. The CPE 104 then uses these measurements to determine the quality of its uplink. These measurements can include SNR and/or BER measurements of the uplink 112(a)–(c). For example, base station 102 can determine the quality of uplink 112(c) based on a measurement by its SNR module 206 (see FIG. 2). A single SNR measurement or a series of several SNR measurements taken during a frame 300 (see FIG. 3) or during multiple frames may be used to determine the uplink quality. In embodiments which include a processor 210 (see FIG. 2), multiple measurements are analyzed by the processor 210 to determine the uplink's quality. For example, SNR measurements may be averaged over N frames 300 to generate the uplink quality measurement. In one embodiment, base station 102 transmits its measurements to a CPE 104 for analysis by a processor 210. The CPE 104 then determines the quality of its uplink.

Continuing to block 804, the base station or CPE compares the calculated uplink quality with the current modulation thresholds, as shown in FIGS. 4 and 5. The current modulation thresholds are an upper threshold 410 and a lower threshold 412 at which the modulation scheme is changed. With reference to FIG. 5, the current modulation thresholds for a QAM-64 transmission are QAM-64 upper threshold 410(c) and QAM-64 lower threshold 412(b). For example, if CPE 104(a) is currently uplinking data to base station 102 using QAM-64 modulation, the modulation scheme will change when the uplink quality exceeds the upper threshold 410(c) at 38 dB or goes below lower threshold 412(b) at 12 dB. Furthermore, the modulation scheme will not be changed when link quality crosses either QAM-256 lower threshold 412(c) or QAM-16 upper threshold 410(b) because they are not current modulation thresholds.

Next at decision block 806, the CPE determines whether the uplink quality has decreased and crossed a modulation lower threshold 412 (see FIG. 4) according to the comparison made in block 804. With reference to FIG. 5, when the modulation is QAM-256 the current modulation lower threshold 412(c) is 32 dB. For QAM-64, the current modulation lower threshold 412(b) is 12 dB. For QAM-16, the current modulation lower threshold 412(a) is 3 dB. If the current modulation lower threshold has been crossed, flow proceeds to block 808 where a less robust modulation is selected. In embodiments where the base station determines whether the uplink quality has crossed the threshold, the base station 102 can send a request to the CPE 104 indicating a desired uplink modulation change. Alternatively, the base station 102 can transit an uplink map to all CPEs 104 in the downlink subframe 302 indicating which CPEs have been allotted uplink PS's and the PS's associated modulations. This allows the base station 102 to indicate to an individual CPE 104 that the modulation scheme has been changed by allotting uplink subframe 304 PSs to that CPE that uses a more robust modulation scheme. For example, if the uplink modulation for CPE 104(a) is to be changed from QAM-64 to QAM-16, the base station 102 assigns uplink subframe PS's which are to be modulated using QAM-16. This uplink assignment serves as an indicator to the CPE that its uplink modulation scheme has been change. Flow then returns to block 802.

Returning to decision block 806, if a current modulation lower threshold has not been crossed, flow proceeds to decision block 810 where the system determines whether the uplink quality has crossed an upper modulation threshold 410. With reference to FIG. 5, when the current modulation is QAM-64 the current modulation upper threshold 410(c) is 38 dB. For QAM-16, the current modulation upper threshold 410(b) is 17 dB. For QPSK, the current modulation upper threshold 410(a) is 5 dB. If the current modulation upper threshold has been exceeded, flow continues to block 812 where the modulation scheme is changed to a less robust, denser modulation. In one embodiment, the base station 102 sends a request to the CPE 104 indicating a desired uplink modulation change. In another embodiment, the base station 102 transmits an uplink map to all CPEs 104 in the downlink subframe 302 indicating which CPEs have been allotted uplink PS's and the PS's associated modulations. The base station 102 indicates to an individual CPE 104 that the modulation scheme has been changed by allotting uplink subframe 304 PSs to that CPE that uses a less robust modulation scheme. For example, if the uplink modulation for CPE 104(a) is to be changed from QAM-16 to QAM-64, the base station 102 assigns uplink subframe PS's which are to be modulated using QAM-64. This uplink assignment serves as an indicator to the CPE that its uplink modulation scheme has been change. Flow then returns to block 802.

Returning to decision block 810, if the downlink quality has not exceeded the upper modulation threshold 610, flow proceeds to block 802.

The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the embodiments should not be taken to imply that the terminology is being re-defined herein to be restricted to including any specific characteristics of the features or aspects of the embodiment with which that terminology is associated. The scope of the embodiments should therefore be construed in accordance with the appended claims and any equivalents thereof.

What is claimed is:

1. A wireless communication system for determining a plurality of uplink modulation schemes and a plurality of downlink modulation schemes for use in a wireless communication system including a base station and a plurality of customer premises equipment (CPE), where each of the plurality of uplink and downlink modulation schemes used by each of the plurality of CPE can be asymmetric, such that the uplink modulation scheme may be different than the downlink modulation scheme, the system comprising:

a plurality of CPE, each including a first modem configured to measure a first link quality based on received downlink data;

a base station having a second modem configured to measure a second link quality for each of the plurality of CPE based on received uplink data;

a first processor configured to receive the first link quality and determine a downlink modulation scheme for each of the plurality of CPE; and a second processor configured to receive the second link quality and determine an uplink modulation scheme for each of the plurality of CPE.

2. The system of claim 1, wherein the first processor is located at each of the plurality of CPE.

3. The system of claim 1, wherein the first processor is located at the base station to receive the first link quality from each of the plurality of CPE.

4. The system of claim 1, wherein the second processor is located at the base station.

5. The system of claim 1, wherein the second processor is located at each of the plurality of CPE to receive the second link quality from the base station.

6. The system of claim 1, wherein the first modem includes a signal to noise ratio module configured to measure the first link quality.

7. The system of claim 1, wherein the first modem includes a bit error rate module configured to measure the first link quality.

8. The system of claim 1, wherein the second modem includes a signal to noise ratio module configured to measure the first link quality.

9. The system of claim 1, wherein the second modem includes a bit error rate module configured to measure the first link quality.

10. A wireless communication system for determining an uplink modulation scheme and a downlink modulation scheme for use in a wireless communication system including a base station and at least one customer premises equipment (CPE), wherein the uplink and downlink modulation schemes are independently determined, such that the uplink modulation scheme may be different than the downlink modulation scheme, the system comprising:

a CPE having
 a first modem configured to measure a first link quality based on received downlink data,
 a first processor configured to receive the first link quality and determine a downlink modulation scheme for the CPE; and a base station having,
 a second modem configured to measure a second link quality for the CPE based on received uplink data,
 a second processor configured to receive the second link quality and determine an uplink modulation scheme for the CPE.

11. A wireless communication system for selecting a plurality of modulation schemes for use with a base station and a plurality of customer premises equipments (CPEs), wherein physical slots in an uplink subframe of data are assigned to the plurality of CPEs by the base station, and wherein the plurality of modulation schemes are used by the plurality of CPEs to modulate data transmitted during the physical slots to the base station, the system comprising:

a plurality of CPEs, each including a first modem configured to measure a quality value for a first physical slot of a first downlink subframe of data and transmit the quality value during a subsequent first physical slot of a first uplink subframe of data; and a base station including a second modem configured to receive each quality value from the plurality of CPEs and determine a modulation scheme for a second physical slot of a second downlink subframe of data for each of the plurality of CPEs, wherein the downlink modulation scheme is determined independently of a modulation scheme for a second physical slot of a second uplink subframe of data.

12. The system of claim 11, wherein the base station further includes a processor configured to determine the modulation scheme for the second physical slot of the second downlink subframe of data.

13. The system of claim 11, wherein the first modem includes a signal to noise ratio module configured to measure the quality value for the first physical slot of the first downlink subframe based on at least one signal to noise ratio measurement.

14. The system of claim 11, wherein the first modem includes a bit error rate module configured to measure the quality value for the first physical slot of the first downlink subframe based on at least one bit error rate measurement.

15. A wireless communication system for determining a first and second uplink modulation scheme and a first and second downlink modulation scheme for use in a wireless communication system including a base station and a first and second customer premises equipment (CPE), wherein the first uplink and downlink modulation schemes may be different, and the second uplink and downlink modulation schemes may be different, the system comprising:

a first CPE configured to receive data that is modulated using a first downlink modulation scheme by a base station and including a first signal to noise ratio module configured to measure a first downlink quality for the received data, and a first processor configured to determine a revised first downlink modulation scheme based on the first downlink quality;

a second CPE configured to receive data that is modulated using a second downlink modulation scheme by the base station and including a second signal to noise ratio module configured to measure a second downlink quality for the received data, and a second processor configured to determine a revised second downlink modulation scheme based on the second downlink quality;

a base station having a third signal to noise ratio module configured to measure a first uplink quality for the received data from the first CPE and a second uplink quality for the received data from the second CPE, and a third processor configured to determine a first uplink modulation scheme based on the first uplink quality for the first CPE and a second uplink modulation scheme based on the second uplink quality for the second CPE.

16. A wireless communication system for determining a plurality of uplink modulation schemes and a plurality of downlink modulation schemes for use in a wireless communication system including a base station and a plurality of customer premises equipment (CPE), wherein each of the plurality of uplink and downlink modulation schemes used by each of the plurality of CPEs can be asymmetric, such that the uplink modulation scheme may be different than the downlink modulation scheme, the system comprising:

a plurality of CPEs, each of the CPE including a first modem configured to measure a first downlink quality for data from a base station; and a base station having a second modem configured to measure uplink quality for transmissions from each of the plurality of CPEs, and a processor configured to determine an uplink modulation scheme for each of the CPE, wherein the processor is further configured to receive the first downlink quality from the plurality of CPEs and determine a downlink modulation scheme for each CPE.

17. The system of claim 16, wherein the first modem includes a signal to noise ratio module.

18. The system of claim 16, wherein the first modem includes a bit error rate module.

19. A method for determining a plurality of uplink modulation schemes and a plurality of downlink modulation schemes for use in a wireless communication system which communicates with frames of data and includes a base station and a plurality of customer premises equipment (CPEs), wherein each of the plurality of uplink and downlink modulation schemes used by each of the plurality of CPEs can be asymmetric, such that the uplink modulation scheme may be different than the downlink modulation scheme, the method comprising:

determining an uplink quality for a first frame of data transmitted by a CPE and received by a base station;

comparing the determined first uplink quality to a plurality of modulation threshold values;

if the first uplink quality has crossed one of the plurality of modulation thresholds selecting a second uplink modulation scheme for the CPE;

receiving a request for the second uplink modulation scheme at the CPE;

determining a downlink quality for a second frame of data transmitted by the base station and received by the CPE;

comparing the determined first downlink quality to a second plurality of modulation threshold values;

if the first downlink quality has crossed one of the plurality of modulation thresholds, selecting a second downlink modulation scheme for the CPE;

receiving a request for the second downlink modulation scheme at the base station;

transmitting a third frame of data by the base station to the CPE using the second downlink modulation scheme;

transmitting a fourth frame of data by the CPE to the base station using the second uplink modulation scheme.

20. The method of claim 19, wherein determining the uplink quality is accomplished using at least one signal to noise ratio ("SNR") measurements for the first frame of data.

21. The method of claim 20, wherein the at least one SNR measurements are averaged in order to determine the uplink quality.

22. The method of claim 19, wherein determining the downlink quality is accomplished using at least one signal to noise ratio ("SNR") measurements for the second frame of data.

23. The method of claim 22, wherein the at least one SNR measurements are averaged in order to determine the downlink quality.

24. The method of claim 19, further comprising sending the selected second uplink modulation scheme by the base station to the CPE within an uplink frame map.

25. The method of claim 19, further comprising sending a request for the selected second downlink modulation scheme by the CPE to the base station.

26. The method of claim 25, further comprising sending a confirmation by the base station to the CPE in response to the request for the second downlink modulation.

27. The method of claim 25, further comprising recognizing the second downlink modulation in the third frame of data by the CPE.

* * * * *

(12) INTER PARTES REEXAMINATION CERTIFICATE (0370th)
United States Patent
Arviv et al.

(10) Number: US 6,549,759 C1
(45) Certificate Issued: Apr. 17, 2012

(54) ASYMMETRIC ADAPTIVE MODULATION IN A WIRELESS COMMUNICATION SYSTEM

(75) Inventors: Eli Arviv, Modiein (IL); Brian Spinar, San Diego, CA (US); Kenneth L. Stanwood, Cardiff by the Sea, CA (US); David Gazelle, San Diego, CA (US); Ofer Zimmerman, Modiin (IL); Penny Efraim, Moshav Nevatim (IL)

(73) Assignee: Wi-Lan, Inc., Ottawa, Ontario (CA)

Reexamination Request:
No. 95/001,299, Aug. 24, 2010

Reexamination Certificate for:
Patent No.: 6,549,759
Issued: Apr. 15, 2003
Appl. No.: 09/938,216
Filed: Aug. 24, 2001

(51) Int. Cl.
*H04B 1/00* (2006.01)
*H04B 7/00* (2006.01)

(52) U.S. Cl. .......................... 455/69; 370/347; 375/222

(58) Field of Classification Search .................... 455/69
See application file for complete search history.

(56) References Cited

To view the complete listing of prior art documents cited during the proceeding for Reexamination Control Number 95/001,299, please refer to the USPTO's public Patent Application Information Retrieval (PAIR) system under the Display References tab.

*Primary Examiner* — Andrew Nalven

(57) ABSTRACT

On embodiment of the system and method provides asymmetric adaptive modulation which allows uplink and downlink subframes of data to be transmitted between a base station and a CPE with different modulation schemes, thus increasing the efficiency of downlink transmissions while maintaining the stability of uplink transmissions. In systems with multiple CPEs, each CPE and base station pair can independently select their uplink and downlink modulation techniques. The system and method are also adaptive in that they adjust the modulation schemes based on, for example, signal to noise ratio measurements or bit error rate measurements.

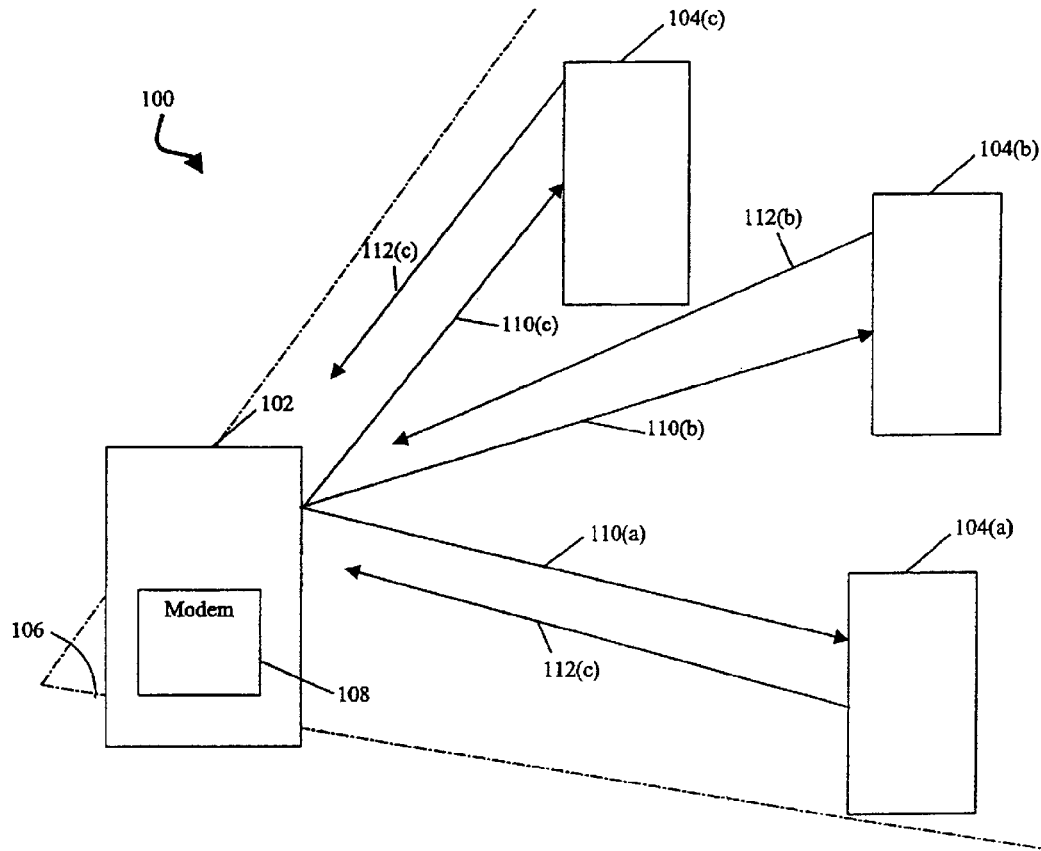

US 6,549,759 C1

INTER PARTES REEXAMINATION CERTIFICATE ISSUED UNDER 35 U.S.C. 316

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1-27 is confirmed.

New claims 28-167 are added and determined to be patentable.

*28. A wireless communication system as claimed in claim 1, wherein the base station allocates uplink bandwidth to CPEs for uplink transmission based on bandwidth requests received from the CPEs.*

*29. A wireless communication system as claimed in claim 1, wherein the first modem provides the downlink modulation scheme to the base station.*

*30. A wireless communication system as claimed in claim 1, wherein the first modem at a CPE obtains the first link quality based on one or more measurements performed on a data block allocated to the CPE in a downlink subframe.*

*31. A wireless communication system as claimed in claim 30, wherein the second modem transmits data to the CPE in a subsequent downlink subframe using the downlink modulation scheme determined by the first processor.*

*32. A wireless communication system as claimed in claim 1, wherein the second modem provides the uplink modulation scheme determined by the first modem of a CPE to the respective CPE.*

*33. A wireless communication system as claimed in claim 1, wherein the second modem obtains the second link quality by performing one or more measurements on a data block allocated to the respective CPE in an uplink subframe.*

*34. A wireless communication system as claimed in claim 33, wherein the first modem transmits data to the base station in a subsequent uplink subframe using the uplink modulation scheme determined by the second processor.*

*35. A wireless communication system as claimed in claim 1, wherein the first modem transmits uplink data during a data block allocated to a CPE in an uplink subframe, the data block being specified by the base station based on one or more communication parameters.*

*36. A wireless communication system as claimed in claim 35, wherein the one or more communication parameters include the quality of service of the connections served by the CPE.*

*37. A wireless communication system as claimed in claim 35, wherein the one or more communication parameters include an amount of bandwidth requested for the connections served by the CPE.*

*38. A wireless communication system as claimed in claim 35, wherein the one or more communication parameters include the bandwidth available in the uplink subframe for sharing between the plurality of CPEs.*

*39. A wireless communication system as claimed in claim 1, wherein the second modem includes a signal to noise ratio module configured to measure the second link quality.*

*40. A wireless communication system as claimed in claim 1, wherein the second modem includes a bit error rate module configured to measure the second link quality.*

*41. A wireless communication system as claimed in claim 1, wherein the base station determines downlink bandwidth allocated to a CPE based on one or more communication parameters.*

*42. A wireless communication system as claimed in claim 41, wherein the one or more downlink parameters include the type of connections served by the CPE.*

*43. A wireless communication system as claimed in claim 41, wherein the one or more communication parameters include the bandwidth available for sharing between the CPE and at least another CPE scheduled to receive data in the downlink frame.*

*44. A wireless communication system as claimed in claim 41, wherein the one or more communication parameters include a transmission time of the downlink data block within the downlink frame.*

*45. A wireless communication system as claimed in claim 30, wherein the second modem is further configured to transmit control information for downlink transmission to the CPE, specifying the downlink modulation scheme and a respective bandwidth allocation for the data block allocated to the CPE in the downlink subframe.*

*46. A wireless communication system as claimed in claim 45, wherein the control information is transmitted in a map provided in a downlink frame.*

*47. A wireless communication system as claimed in claim 33, wherein the second modem is further configured to transmit control information for uplink transmission to the CPE, specifying the uplink modulation scheme and a respective bandwidth allocation for data block allocated to the CPE in the uplink subframe.*

*48. A wireless communication system as claimed in claim 47, wherein the control information is transmitted in an uplink map provided in a downlink frame.*

*49. A wireless system as claimed in claim 1, wherein the first processor determines the downlink modulation scheme for a respective CPE using one or more ranges for the first link quality.*

*50. A wireless system as claimed in claim 49, wherein a range for the first link quality is provided between a first upper and a first lower threshold.*

*51. A wireless system as claimed in claim 1, wherein the second processor determines the uplink modulation scheme for a respective CPE using one or more ranges for the second link quality.*

*52. A wireless system as claimed in claim 51, wherein a range for the second link quality is provided between a second upper and a second lower threshold.*

*53. The system of claim 1, wherein the first processor determines the downlink modulation scheme for a respective CPE using a plurality of defined quality values delimiting the changes between the downlink modulation schemes.*

*54. The system of claim 53, wherein the downlink modulation scheme is delimited between an upper and a lower defined quality value.*

*55. The system of claim 54, wherein the first processor causes a change of the downlink modulation scheme to a more robust modulation scheme when the link quality falls below a lower threshold.*

*56. The system of claim 55, wherein the lower threshold is set at a quality value less than the lower defined quality value.*

*57. The system of claim 54, wherein the second processor causes a change of the uplink modulation scheme to a less*

58. The system of claim 57, wherein the upper threshold is set at a quality value higher than the upper defined quality value.

59. A wireless communication system as claimed in claim 11, wherein, the respective downlink modulation scheme is determined using a plurality of ranges for downlink quality values.

60. A wireless communication system as claimed in claim 11, wherein a modulation scheme for a physical slot allocated to a CPE in a downlink subframe is determined using a plurality of ranges for the downlink quality value.

61. A wireless communication system as claimed in claim 59, wherein a range for the downlink quality value is specified between an upper and a lower threshold.

62. A wireless communication system as claimed in claim 11, wherein the second modem is further configured to measure an uplink quality value for data received from a CPE in an uplink subframe, and transmit the uplink quality value to the CPE during a subsequent downlink subrame.

63. A wireless communication system as claimed in claim 62, wherein the first modem is further configured to receive the uplink quality value, determine an uplink modulation scheme based on the uplink quality value and transmit uplink data in a subsequent uplink subframe using the uplink modulation scheme.

64. A wireless communication system as claimed in claim 11, wherein the second modem is configured to measure an uplink quality value for data received from a CPE in an uplink subframe, determine a respective uplink modulation scheme based on the uplink quality value and transmit the respective uplink modulation scheme to the CPE during a subsequent downlink subframe.

65. A wireless communication system as claimed in claim 64, wherein the respective uplink modulation scheme is determined using a plurality of ranges for the uplink quality value.

66. A wireless communication system as claimed in claim 65, wherein a range for the uplink quality value is specified between an upper and a lower threshold.

67. A wireless communication system as claimed in claim 11, wherein a downlink modulation scheme for the second physical slot allocated to a CPE is determined using a plurality of thresholds for a downlink quality value.

68. A wireless communication system as claimed in claim 65, wherein the plurality of ranges for the uplink quality value are different from a plurality of ranges for a downlink quality value used for determining a respective downlink modulation scheme.

69. A wireless communication system as claimed in claim 11, wherein a downlink modulation scheme for the second physical slot of the second downlink subframe is further determined by the base station based on common capabilities of the base station and the respective CPE.

70. A wireless communication system as claimed in claim 11, wherein a number of physical slots assigned in an uplink subframe by the base station to a respective CPE is determined based on one or more communication parameters.

71. A wireless communication system as claimed in claim 70, wherein the respective CPE serves one or more connections and wherein the one or more communication parameters include a quality of service of the one or more connections served by the respective CPE.

72. A wireless communication system as claimed in claim 70, wherein the respective CPE serves one or more connections and the one or more communication parameters include an amount of bandwidth requested for the one or more connections served by the respective CPE.

73. A wireless communication system as claimed in claim 70, wherein the one or more communication parameters include a bandwidth available in the uplink subframe for sharing with at least another CPE.

74. A wireless communication system as claimed in claim 11, wherein a number of physical slots assigned by the base station to a respective CPE takes into account a request for bandwidth received from the respective CPE.

75. A wireless communication system as claimed in claim 11, wherein the first modem measures a respective quality value over a plurality of downlink subframes.

76. A wireless communication system as claimed in claim 11, wherein the second modem is configured to determine the downlink modulation scheme for a respective CPE based on the quality value measured by the first modem over a plurality of downlink frames.

77. A wireless communication system as claimed in claim 11, wherein a second CPE, in geographic proximity with the respective CPE, uses the downlink modulation scheme determined for the respective CPE.

78. A wireless communication system as claimed in claim 11, wherein the first modem determines a respective quality value by averaging a plurality of measurements obtained over a number of downlink subframes.

79. A wireless communication system as claimed in claim 11, wherein the second modem is configured to transmit frame control information which specifies one or more attributes of uplink data in at least the first physical slot of the first uplink subframe.

80. A wireless communication system as claimed in claim 79, wherein the one or more attributes include an identification of the physical slot in the first uplink subframe.

81. A wireless communication system as claimed in claim 79, wherein the one or more attributes indicate a modulation change.

82. A wireless communication system as claimed in claim 11, wherein the second modem is configured to transmit an uplink map specifying CPEs which were allocated physical slots for uplink transmission and the modulation scheme to be used by the CPEs for respective allocated physical slots.

83. A wireless communication system as claimed in claim 82, wherein the uplink map is transmitted in the header of a downlink subframe.

84. A wireless communication system as claimed in claim 11, wherein the second modem is configured to transmit frame control information which specifies one or more attributes of downlink data in at least the first physical slot of the first downlink subframe.

85. A wireless communication system as claimed in claim 84, wherein the one or more attributes include identification of the first physical slot of the first downlink subframe.

86. A wireless communication system as claimed in claim 84, wherein the one or more attributes indicate a modulation change.

87. A wireless communication system as claimed in claim 11, wherein the first modem measures a plurality of quality values during a frame.

88. A wireless communication system as claimed in claim 15, wherein the first uplink modulation scheme and the first downlink modulation schemes are different.

89. A wireless communication system as claimed in claim 15, wherein the second downlink modulation scheme and the second uplink modulation schemes are different.

90. A wireless communication system as claimed in claim 15, wherein the first uplink modulation scheme and the second uplink modulation schemes are different.

91. A wireless communication system as claimed in claim 15, wherein the first and the second CPE transmit uplink data during respective first and second uplink data blocks allocated in an uplink subframe based on one or more communication parameters.

92. A wireless communication system as claimed in claim 91, wherein the one or more communication parameters include the quality of service of the connections served by the first and second CPE.

93. A wireless communication system as claimed in claim 91, wherein the one or more communication parameters include an amount of bandwidth requested for the connections served by the first and second CPE.

94. A wireless communication system as claimed in claim 91, wherein the one or more communication parameters include the bandwidth available in the uplink subframe for sharing between at lest the first and second CPE.

95. A wireless communication system as claimed in claim 91, wherein the base station is also configured to transmit control information for uplink transmission by the first and second CPE, specifying the first and second uplink modulation schemes and a respective bandwidth allocation for the first and second uplink data blocks.

96. A wireless communication system as claimed in claim 95, wherein the control information is transmitted to the first and second CPE in a downlink frame.

97. A wireless communication system as claimed in claim 96, wherein the control information is transmitted in an uplink map, which specifies at least the first and second uplink data blocks.

98. A wireless communication system as claimed in claim 95, wherein the control information is transmitted in an uplink map, provided to the first and second CPE in a downlink frame.

99. A wireless communication system as claimed in claim 15, wherein the base station transmits downlink data to the first and second CPE during a respective first and second downlink data block allocatd to the first and second CPE in an downlink subframe based on one or more communication parameters.

100. A wireless communication system as claimed in claim 99, wherein the one or more communication parameters include a quality of service of connections served by the first and second CPE.

101. A wireless communication system as claimed in claim 99, wherein the one or more communication parameters include a type of service of connections served by the first and second CPE.

102. A wireless communication system as claimed in claim 100, wherein the one or more communication parameters include the bandwidth available in the downlink subframe for shaing between at least the first and second CPE.

103. A wireless communication system as claimed in claim 100, wherein the base station is also configured to transmit control information for downlink transmission to the first and second CPE, specifying the first and second downlink modulation schemes and a respective bandwidth allocation for the first aned second downlink data blocks.

104. A wireless communication system as claimed in claim 103, wherein the control information is transmitted in a map, which specifies at least the first and second downlink data blocks.

105. A method as claimed in claim 19, wherein associated with a modulation scheme is an upper threshold which must be crossed to change to that modulation scheme and a lower threshold, below the upper threshold, which must be crossed to change from that modulation scheme to a more robust modulation scheme.

106. A method as claimed in claim 19 wherein associated with one or more of the modulation schemes is an upper threshold which must be crossed to change to that modulation scheme and a lower threshold, below the upper threshold, which must be crossed to change from that modulation scheme to a more robust modulation scheme.

107. A wireless communication system for selecting a plurality of modulation schemes for use by a base station and a plurality of customer premises equipments (CPEs), wherein physical slots in a subframe are allocated to one or more CPEs by the base station on a frame-by-frame basis for uplink and downlink transmission based on one or more communication parameters, the system comprising:
   a CPE including:
      a CPE modem configured to measure a downlink quality value for data received in a downlink physical slot allocated to the CPE of a downlink subframe, and to transmit the downlink quality value during a subsequent uplink subframe; and
      a CPE processor configured to determine an uplink modulation scheme based on an uplink quality value, and instructing the first modem to transmit uplink data in a subsequent uplink subframe using the determined uplink modulation scheme; and
   the base station including:
      a base station modem configured to measure the uplink quality value for data received in an uplink physical slot of an uplink subframe, and to transmit the uplink quality value to the CPE during a subsequent downlink subframe; and
      a base station processor configured to receive the downlink quality value from the CPE, determine a downlink modulation scheme, and instruct the second modem to transmit downlink data in a subsequent downlink subframe using the determined downlink modulation scheme,
   wherein the downlink modulation scheme may be different from an uplink modulation scheme determined for a physical slot allocated to the CPE in an uplink subframe of the same frame.

108. A wireless communication system as claimed in claim 107, wherein the one or more communication parameters include the quality of service of the connections served by the CPE.

109. A wireless communication system as claimed in claim 107, wherein the one or more communication parameters include the bandwidth available for sharing between the CPE and at least another CPE scheduled to receive in the downlink subframe.

110. A wireless communication system as claimed in claim 107, wherein the one or more communication parameters include a transmission time of the respective physical slot within the downlink subframe.

111. A wireless communication system as claimed in claim 107, wherein the downlink quality value is obtained by averaging a plurality of measurements obtained over a plurality of downlink subframes.

112. A wireless communication system as claimed in claim 107, wherein the CPE is adapted to transmit uplink data in an uplink physical slot assigned to the CPE in an uplink subframe.

113. A wireless communication system as claimed in claim 107, wherein the CPE includes a bit error rate module.

114. A wireless communication system as claimed in claim 107, wherein the CPE is configured to transmit the downlink quality value periodically.

115. A method for determining a plurality of uplink and downlink modulation schemes for exchanging data between a base station and a plurality of customer premises equipment (CPEs), wherein the uplink and downlink modulation schemes used by a CPE may be asymmetric, the method comprising:

monitoring data received in an uplink data block allocated to the CPE in a first uplink frame for determining an uplink quality value for uplink data transmitted by a CPE to the base station;

comparing the uplink quality value to a plurality of uplink thresholds;

selecting an uplink modulation scheme for the CPE based on the uplink thresholds and on common capabilities of the base station and the CPE;

receiving the selected uplink modulation scheme at the CPE;

monitoring data received in a downlink data block allocated to the CPE in a first downlink frame for determining a downlink quality value for downlink data transmitted by the base station to the CPE;

comparing the downlink quality value to a plurality of downlink thresholds;

selecting a downlink modulation scheme for the CPE based on the downlink thresholds and on common capabilities of the base station and the CPE;

receiving a request for the selected downlink scheme at the base station;

transmitting uplink data from the CPE to the base station in a second uplink frame using the selected uplink modulation scheme;

transmitting downlink data and control information from the base station to the CPE in a second downlink frame using the selected downlink modulation scheme, the control information specifying one or more attributes for uplink data to be transmitted by the CPE and for reception of downlink data by the CPE, wherein the base station allocates uplink and downlink bandwidth to the CPE based on one or more communication parameters, including one or more of a qulaity of service of one or more connections served by the CPE, a type of service of one or more connections served by the CPE, the amount of bandwidth allocated to the CPE in the second downlink frame and combinations thereof.

116. A method as claimed in claim 115, wherein the attributes include an amount of bandwidth allocated to the CPE in the respective uplink and downlink frames and the uplink and downlink modulation.

117. A wireless communication system for selecting a plurality of modulation schemes for modulating data transmitted between a base station and a plurality of customer premises equipment (CPEs), wherein a data block is assigned to a CPE in an uplink subframe by the base station based on a request from the CPE and further based on one or more communication parameters, the system comprising:

at the base station, a base station modem configured to measure an uplink quality value for data received from a CPE in a respective uplink data block of the uplink subframe and to transmit control information for uplink transmission specifying a subsequent uplink data block for a subsequent uplink subframe, including an uplink modulation scheme for the subsequent uplink data block; and a base station processor configured to determine the uplink modulation scheme for the subsequent uplink data block based on the uplink quality value; and at the CPE, a CPE modem configured to receive from the base station the control information for uplink transmission, measure a downlink quality based on received downlink data, and transmit uplink data in the subsequent uplink data block using the uplink modulation scheme determined by the base station, and a CPE processor configured to receive the downlink quality and determine a downlink modulation scheme for subsequent downlink communication to the CPE based on the downlink quality, wherein the uplink modulation scheme used by the CPE for uplink transmission to the base station may be different from a downlink modulation scheme used by the base station for downlink transmission to the CPE.

118. A wireless communication system as claimed in claim 117, wherein the uplink modulation scheme used by the CPE for uplink transmission to the base station is different from the downlink modulation scheme used by the base station for downlink transmission to the CPE.

119. A wireless communication system as claimed in claim 117, wherein the CPE modem is further configured to receive from the base station the control information for uplink transmission.

120. A wireless communication system as claimed in claim 117, wherein the one or more communication paramters include a quality of service of a connection served by the CPE.

121. A wireless communication system as claimed in claim 117, wherein the one or more communication parameters include an amount of bandwidth requested for one or more connections served by the CPE.

122. A wireless communication system as claimed in claim 117, wherein the one or more communication parameters include bandwidth available in the uplink subframe for sharing with at least another CPE.

123. A wireless communication system as claimed in claim 119, wherein an uplink map specifies one or more attributes for the uplink data block allocated to the CPE.

124. A wireless communication system as claimed in claim 119, wherein an uplink map is transmitted in a control portion of a downlink subframe.

125. A wireless communication system as claimed in claim 123, wherein the one or more attributes include identification of the CPEs which were allocated physical slots for uplink transmission in the uplink subframe.

126. A wireless communication system as claimed in claim 123, wherein the one or more attributes specify the uplink data block allocated to the CPE.

127. A wireless communication system as claimed in claim 123, wherein the one or more attributes identify the uplink modulation scheme.

128. A wireless communication system as claimed in claim 117, wherein the CPE modem is further configured to measure a downlink quality value for data received in a downlink data block of a downlink subframe.

129. A wireless communication system as claimed in claim 119, wherein the control information for uplink transmission is provided in an uplink map.

130. A wireless communication system as claimed in claim 128, wherein the CPE modem is further configured to transmit the determined downlink modulation scheme to the base station.

131. A wireless communication system as claimed in claim 128, wherein the downlink modulation scheme is determined using a plurality of ranges for the downlink quality value.

132. A wireless communication system as claimed in claim 131, wherein a range for the downlink quality value is specified between an upper and a lower threshold.

133. A wireless communication system as claimed in claim 117, wherein the uplink modulation scheme is determined by the base station based on common capabilities of the base station and the CPE.

134. A wireless communication system as claimed in claim 128, wherein the downlink modulation scheme is determined by the base station based on common capabilities of the base station and the CPE.

135. A wireless communication system as claimed in claim 117, wherein the base station processor is further configured to provide control information for downlink reception in a map that specifies one or more attributes of at least a downlink data block allocated to the CPE.

136. A wireless communication system as claimed in claim 135, wherein the map is transmitted in a control portion of downlink subframes transmitted by the base station to the plurality of CPEs.

137. A wireless communication system as claimed in claim 135, wherein the one or more attributes specify at least the downlink data block.

138. A wireless communication system as claimed in claim 135, wherein the one or more attributes include the downlink modulation scheme for the data block.

139. A wireless communication system comprising a base station in communication with a plurality of customer premise equipment (CPE), wherein data blocks are allocated to CPEs by the base station in downlink frames based on one or more downlink communication parameters, and data blocks in uplink frames are allocated to the CPE by the base station based on one or more uplink communication parameters, the system comprising:
at a CPE,
a CPE modem configured to measure a downlink quality value based on data received in a downlink data block of a downlink frame, and a CPE processor configured to receive the downlink quality value, determine a downlink modulation scheme based on a first range for downlink quality, and instruct the CPE modem to transmit a signal indicative of the downlink modulation scheme to the base station,
at the base station,
a base station modem configured to measure an uplink quality value based on data received in an uplink data block of an uplink frame, and a base station processor configured to receive the uplink quality value, determine an uplink modulation scheme based on a second range for the uplink quality, and instruct the base station modem to transmit a signal indicative of the uplink modulation scheme,
wherein the downlink modulation scheme and the uplink modulation scheme may be different.

140. A wireless communication system as claimed in claim 139, wherein the downlink modulation scheme and the uplink modulation scheme are different.

141. A wireless communication system as claimed in claim 139, wherein the one or more downlink communication parameters include a type of connection served by the CPE.

142. A wireless communication system as claimed in claim 139, wherein the one or more downlink comunication parameters include an amount of bandwidth available for sharing between the CPE and at least another CPE scheduled to receive data in the downlink frame.

143. A wireless communication system as claimed in claim 139, wherein the one or more downlink communication parameters include a transmission time of the downlink data block within the downlink frame.

144. A wireless communication system as claimed in claim 139, wherein the uplink data block is allocated to the CPE in response to a bandwidth request transmitted by the CPE.

145. A wireless communication system as claimed in claim 139, wherein the first range is defined by a first lower threshold and a first upper threshold.

146. A wireless communication system as claimed in claim 139, wherein the second range is defined by a second lower threshold and a second upper threshold.

147. A wireless communication system as claimed in claim 139, wherein the downlink quality value comprises a bit error rate value measured by the CPE modem.

148. A wireless communication system as claimed in claim 139, wherein the uplink quality value comprises a bit error rate value measured by the base station modem.

149. A wireless communication system as claimed in claim 139, wherein the downlink quality value comprises a signal-to-noise ratio value measured by the CPE modem.

150. A wireless communication system as claimed in claim 139, wherein the uplink quality value comprises a signal-to-noise ratio value measured by the base station modem.

151. A wireless communication system as claimed in claim 139, wherein the downlink quality value is obtained by averaging a plurality of measurements performed over a plurality of downlink frames.

152. A wireless communication system as claimed in claim 139, wherein the downlink quality value is obtained by averaging a plurality of measurements obtained over the downlink frame.

153. A wireless communication system as claimed in claim 139, wherein the uplink quality value is obtained by averaging a plurality of measurements performed over a plurality of uplink frames.

154. A wireless communication system as claimed in claim 139, wherein the uplink quality value is obtained by averaging a plurality of measurements obtained over the uplink frame.

155. A wireless communication system as claimed in claim 139, wherein the one or more uplink communication parameters include a quality of service of a connection served by the CPE.

156. A wireless communication system as claimed in claim 139, wherein the one or more uplink communication parameters include an amount of bandwidth available in the uplink frame for sharing between the CPE and at least another CPE scheduled to transmit data in the uplink frame.

157. A wireless communication system as claimed in claim 139, wherein the one or more uplink communication parameters include a size of the uplink data block within the uplink frame.

158. A wireless communication system as claimed in claim 139, wherein the uplink data block allocated to the CPE in the uplink frame is specified by the base station using control information transmitted by the base station to the CPE.

159. A wireless communication system as claimed in claim 158, wherein the control information is transmitted in an uplink map.

160. A wireless communication system as claimed in claim 139, wherein the downlink data block allocated to the CPE in the downlink frame is specified by the base station using control information transmitted by the base station to the CPE.

161. A wireless communication system as claimed in claim 160, wherein the control information is transmitted in a map.

162. The system of claim 1, wherein the second processor determines the uplink modulation scheme for a respective CPE using a plurality of defined quality values delimiting the changes between the uplink modulation schemes.

163. The system of claim 162, wherein the uplink modulation scheme is delimited between an upper and a lower defined quality value.

164. The system of claim 163, wherein the second processor causes a change of the uplink modulation scheme to a more robust modulation scheme when the link quality falls below a lower threshold.

165. The system of claim 164, wherein the lower threshold is set at a quality value less than the lower defined quality value.

166. The system of claim 163, wherein the second processor causes a change of the uplink modulation scheme to a less robust modulation scheme when the link quality exceeds an upper threshold.

167. The system of claimed in claim 166, wherein the upper threshold is set at a quality value higher than the upper defined quality value.

* * * * *